(12) United States Patent
Asahara

(10) Patent No.: US 7,612,901 B2
(45) Date of Patent: Nov. 3, 2009

(54) IMAGE FORMING APPARATUS, CONTROL METHOD, AND STORAGE MEDIUM STORING A COMPUTER PROGRAM, FOR INHIBITING SWITCHING TO A NORMAL MODE IN A REMOVABLE STORAGE DEVICE IS DETECTED OR INHIBITING A SPECIFIC MODE IF THE REMOVABLE STORAGE DEVICE IS NOT DETECTED

(75) Inventor: Hideo Asahara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 94 days.

(21) Appl. No.: 11/395,317

(22) Filed: Mar. 31, 2006

(65) Prior Publication Data

US 2006/0221378 A1    Oct. 5, 2006

(30) Foreign Application Priority Data

Mar. 31, 2005    (JP)    ............................. 2005-103824

(51) Int. Cl.
*G06K 15/00*    (2006.01)

(52) U.S. Cl. .................... 358/1.14; 358/1.13; 358/1.15; 358/1.16

(58) Field of Classification Search ................ 358/1.14, 358/448, 1.6, 1.15, 1.13; 399/75; 455/558; 707/200; 702/127; 365/49; 709/213; 717/168
See application file for complete search history.

(56) References Cited

U.S. PATENT DOCUMENTS

| | | | |
|---|---|---|---|
| 6,327,446 B1 * | 12/2001 | Suzuki .......................... 399/75 |
| 6,362,893 B1 * | 3/2002 | Francis et al. ............... 358/1.14 |
| 6,839,721 B2 * | 1/2005 | Schwols ....................... 707/200 |
| 6,947,171 B1 * | 9/2005 | Narusawa et al. ............. 358/1.6 |
| 7,174,266 B2 * | 2/2007 | Onomichi et al. ........... 702/127 |
| 2002/0051167 A1 * | 5/2002 | Francis et al. ............... 358/1.14 |
| 2002/0160808 A1 * | 10/2002 | Uehara et al. ................ 455/558 |
| 2005/0036348 A1 * | 2/2005 | Aoyama ....................... 365/49 |
| 2005/0141025 A1 * | 6/2005 | Hanada ...................... 358/1.15 |
| 2005/0182822 A1 * | 8/2005 | Daniel et al. ................. 709/213 |
| 2005/0240919 A1 * | 10/2005 | Kim et al. .................... 717/168 |

FOREIGN PATENT DOCUMENTS

| | | |
|---|---|---|
| JP | 2000-194448 A | 7/2000 |
| JP | 2001-331871 A | 11/2001 |
| JP | 2003-109119 A | 11/2003 |
| JP | 2004-110382 A | 4/2004 |
| JP | 2004-280417 A | 10/2004 |

\* cited by examiner

*Primary Examiner*—Twyler L Haskins
*Assistant Examiner*—Nicholas C Pachol
(74) *Attorney, Agent, or Firm*—Rossi, Kimms & McDowell, LLP

(57) ABSTRACT

An electronic apparatus that is capable of securely preventing a user who has worked in a dedicated mode using a storage device such as a removable medium from forgetting to remove the storage device. The electronic apparatus is operated in a normal mode or a dedicated mode in which a particular process including accessing an available medium is performed. When the dedicated mode is switched to the normal mode by the mode switching module, a removable medium detecting module detects whether an available storage device is connected to a removable media drive, and if an available storage device is detected by the removable medium detecting module, the switching to the normal mode is inhibited by mode switching inhibiting module.

10 Claims, 16 Drawing Sheets

71

(1)DEVICE DESCRIPTOR
→ (1:*)CONFIGURATION DESCRIPTOR
→ (1:*)INTERFACE DESCRIPTOR
→ (1:*)END-POINT DESCRIPTOR

IMAGE FORMING APPARATUS, CONTROL METHOD, AND STORAGE MEDIUM STORING A COMPUTER PROGRAM, FOR INHIBITING SWITCHING TO A NORMAL MODE IN A REMOVABLE STORAGE DEVICE IS DETECTED OR INHIBITING A SPECIFIC MODE IF THE REMOVABLE STORAGE DEVICE IS NOT DETECTED

BACKGROUND OF THE INVENTION

1. Field of the Invention

The present invention relates to an electronic apparatus such as an image forming apparatus, a control method for controlling the electronic apparatus, a control program for implementing the control method, and a storage medium for storing the program.

2. Description of the Related Art

Some digital multifunction peripherals are provided with a drive unit for reading and writing data stored in removable media. For example, a digital multifunction peripheral is known that incorporates a drive unit which is compatible with a removable medium such as a floppy (registered trademark) disk (FD) and an optical disk. According to this type of digital multifunction peripheral, it is possible to print image data stored in a removable medium by means of the printing function of the digital multifunction peripheral and store image data formed by the digital multifunction peripheral into a removable medium.

There have also recently been proposed multifunction peripherals with a USB host interface. By using the USB host interface, a user can connect any external drive unit compatible with removable medium or a memory device with a USB host interface to the digital multifunction peripheral, even if the peripheral does not accommodate a removable-medium-compatible drive unit. Thus, the digital multifunction peripheral equipped with a USB interface can easily provide functions of transmitting image data held or formed by the digital multifunction peripheral to an external drive unit or a network to store the data in a removable medium, and receiving, via an external drive unit or a network, image data stored in a removable medium to print out the data, and are therefore higher-value added products for users.

Removable media are highly convenient in use. On the other hand, using the removable media may cause security problems. For example, if a removable medium in which a confidential document is stored is left behind somewhere, information leakage may be caused.

Accordingly, most of the digital multifunction peripherals have a system for controlling access to image data or document data held by the document management function or the like thereof, to thereby prevent leakage of information. However, if the data is taken outside the digital multifunction peripheral with the use of a removable medium, the benefit of the system cannot be realized, and therefore, the problem cannot be solved completely.

The same situation may happen in the case of a paper medium. In the case of a removable medium, however, the problem is more serious because data taken out as digital data can be easily copied, falsified and misappropriated and because it is difficult to find the removable medium being taken out without authorization since it is extremely small-sized in recent years. Under these circumstances, various countermeasures have been devised.

For example, there has been proposed a method in which a user authentication function is provided to thereby permit only an authenticated user to use a removable medium, thus enhancing data security. More specifically, the proposed method is implemented by a computer. At the front face of a computer body, there are multiple file bays which can contain an information recording/reproduction device and to which an openable file bay cover is attached so as to cover the multiple file bays. The file bay cover when closed is locked by an electronic lock unit provided in the computer body and made in contact with a latch that is provided in the file bay cover. The electronic lock unit is electrically connected with the computer body. If a user of the computer is authenticated by password or fingerprint matching and the like, then the electronic lock unit is controlled from the computer body to automatically be unlocked (see Japanese Laid-Open Patent Publication (Kokai) No. 2000-194448, for example).

By attaching a file bay cover to file bays which contain an information recording/reproduction device, so as to be opened and closed by an electronic lock mechanism as described above, it is possible to prevent an unauthorized user, that is, a user who is not authenticated by password or fingerprint matching and the like from maliciously using the information recording/reproduction device, to thereby prevent confidential information stored in the computer from being copied to a removable storage medium and taken out.

With the method described above, however, there is a possibility that a user with a right of access may lose a removable medium in which highly confidential data is stored, and therefore, security cannot sufficiently be protected.

Furthermore, there has also been proposed a method for enhancing the security of data recorded on a removable medium by providing a fingerprint authentication device or a password-based authentication mechanism inside the removable medium (see Japanese Laid-Open Patent Publication (Kokai) No. 2004-110382, for example). Thereby, even when the removable medium is lost, it is not necessary to concern about malicious use of data in the removable medium by a person who picks up the removable medium, and security can be enhanced.

According to this method, however, only a removable medium with a special mechanism can be used, and convenience for users is considerably impaired. Furthermore, in the case of an apparatus other than a common personal computer, such as a digital multifunction peripheral, there is a problem that the system in a removable medium cannot be guaranteed to operate properly. Furthermore, there is a problem that the security improvement effect cannot be achieved, if a user loses or leaves behind the removable medium while the lock with a password is released.

Accordingly, there has recently been proposed a method for preventing a user from forgetting to remove a removable medium, as a basic solution.

For example, in a printing service offered by a digital multifunction peripheral with an accounting system, there has been proposed an image printing apparatus which prevents a user from forgetting to remove a removable medium by performing payment of changes to the user after printing ends and the removable medium is removed (see Japanese Laid-Open Patent Publication (Kokai) No. 2001-331871, for example). It is conceivable that a user generally has a strong awareness of the price. Therefore, by causing the user to remove a removable medium before receiving changes, the risk of forgetting to remove the removable medium can be reduced.

There has been also proposed a digital printing machine having a function of performing control such that the last page is not printed unless a removable medium is removed from a removable medium insertion section (see Japanese Laid-Open Patent Publication (Kokai) No. 2004-280417, for example). It is essential here to remove a removable medium in order for a user to obtain a desired printing result, and consequently, this is effective as a method for preventing the user from forgetting to remove the removable medium.

The above proposed techniques make it possible to prevent a user who uses an accounting system or a user who performs printing from forgetting to remove a removable medium. However, this is effective only for users who perform such works. In other situations, for example, in the case where a service person or a device administrator uses a removable medium to perform work in a dedicated mode different from a normal mode, there is a problem that it is not possible to prevent such a person from forgetting to remove the removable medium.

For example, there may be a case where a service person uses a removable medium to update firmware in a service mode which is a dedicated mode or store equipment information typified by counter information, application, license information, customer information and the like in a removable medium to carry it. There may also be a case where a device administrator uses a removable medium to update firmware in an administrator mode which is a dedicated mode. If such a service person or device administrator forgets to remove the removable medium, there is a risk of leakage of important data, which is a serious security problem.

SUMMARY OF THE INVENTION

An object of the present invention is to provide an electronic apparatus capable of securely preventing a user who has worked in a dedicated mode using a storage device such as a removable medium from forgetting to remove the storage device, a control method for controlling the electronic apparatus, a control program, and a storage medium for storing the program.

To attain the above object, in a first aspect of the present invention, there is provided an electronic apparatus comprising interface means for enabling access to a storage device, mode switching means for performing switching between a normal mode and a dedicated mode in which a particular process including accessing the storage device is performed, storage device detecting means for detecting whether an available storage device is connected to the interface means when the dedicated mode is switched to the normal mode by the mode switching means, and normal mode inhibiting means for inhibiting switching to the normal mode when an available storage device is detected by the storage device detecting means.

Preferably, the electronic apparatus is an image forming apparatus, the normal mode is a mode in which a general user operates the image forming apparatus, and the dedicated mode is a service mode in which a service person operates the image forming apparatus.

To attain the above object, in a second aspect of the present invention, there is provided an electronic apparatus comprising operating means for inputting an operation by a user, interface means for enabling access to a storage device, mode switching means for performing switching between a normal mode and a dedicated mode in which a particular process including accessing the storage device is performed, storage device detecting means for detecting whether an available storage device is connected to the interface means after the dedicated mode is switched to the normal mode by the mode switching means, and normal mode inhibiting means for inhibiting an operation through the operating means in the normal mode when an available storage device is detected by the storage device detecting means.

Preferably, the electronic apparatus is an image forming apparatus, the normal mode is a mode in which a general user operates the image forming apparatus, and the dedicated mode is a service mode in which a service person operates the image forming apparatus.

Preferably, the electronic apparatus comprises a display section for displaying information, and when an available storage device is detected by the storage device detecting means, the normal mode inhibiting means displays on the display section a warning prompting that the storage device should be removed.

Preferably, the storage device detecting means comprises determination means for periodically communicating with the storage device to determine whether the storage device is in an available state, a holding means for holding determination information obtained by the determination means, and detection means for detecting that an available storage device is connected to the interface means based on the determination information held by the holding means.

Preferably, the interface means is a drive unit included in the electronic apparatus.

Preferably, the interface means is a general-purpose interface included in the electronic apparatus.

To attain the above object, in a third aspect of the present invention, there is provided a control method for controlling an electronic apparatus comprising interface means for enabling access to a storage device, the electronic apparatus being capable of executing, separately from a normal mode, a dedicated mode in which a particular processes including accessing the storage device is performed, the method comprising a mode switching step of performing switching between the normal mode and the dedicated mode, a storage device detecting step of detecting whether an available storage device is connected to the interface means when the dedicated mode is switched to the normal mode in the mode switching step, and a normal mode inhibiting step of inhibiting switching to the normal mode when an available storage device is detected in the storage device detecting step.

Preferably, the electronic apparatus is an image forming apparatus, the normal mode is a mode in which a general user operates the image forming apparatus, and the dedicated mode is a service mode in which a service person operates the image forming apparatus.

To attain the above object, in a fourth aspect of the present invention, there is provided a control method for controlling an electronic apparatus comprising operating means for inputting an operation by a user and interface means for enabling access to a storage device, the electronic apparatus being capable of executing, separately from a normal mode, a dedicated mode in which a particular processes including accessing the storage device is performed, the method comprising a mode switching step of performing switching between the normal mode and the dedicated mode, a storage device detecting step of detecting whether an available storage device is connected to the interface means after the dedicated mode is switched to the normal mode in the mode switching step, and a normal mode inhibiting step of inhibiting operation through the operating means in the normal mode when an available storage device is detected in the storage device detecting step.

Preferably, the electronic apparatus is an image forming apparatus, the normal mode is a mode in which a general user operates the image forming apparatus, and the dedicated mode is a service mode in which a service person operates the image forming apparatus.

To attain the above object, in a fifth aspect of the present invention, there is provided a control program for causing a computer to perform a control method for controlling an electronic apparatus comprising interface means for enabling access to a storage device, the electronic apparatus being capable of executing, separately from a normal mode, a dedicated mode in which a particular processes including accessing the storage device is performed, the control program comprising a mode switching module for performing switching between the normal mode and the dedicated mode, a storage device detecting module for detecting whether an available storage device is connected to the interface means when the dedicated mode is switched to the normal mode by the mode switching module, and a normal mode inhibiting module for inhibiting switching to the normal mode when an available storage device is detected by the storage device detection module.

To attain the above object, in a sixth aspect of the present invention, there is provided a control program for causing a computer to perform a control method for controlling an electronic apparatus comprising operating means for inputting an operation by a user and interface means for enabling access to a storage device, the electronic apparatus being capable of executing, separately from a normal mode, a dedicated mode in which a particular processes including accessing the storage device is performed, the program comprising a mode switching module for performing switching between the normal mode and the dedicated mode, a storage device detecting module for detecting whether an available storage device is connected to the interface means after the dedicated mode is switched to the normal mode by the mode switching module, and a normal mode inhibiting module for inhibiting operation through the operating means in the normal mode when an available storage device is detected by the storage device detection module.

To attain the above object, in a seventh aspect of the present invention, there is provided a computer-readable storage medium storing a control program for controlling an electronic apparatus comprising interface means for enabling access to a storage device, the electronic apparatus being capable of executing, separately from a normal mode, a dedicated mode in which a particular processes including accessing the storage device is performed, the control program comprising a mode switching module for performing switching between the normal mode and the dedicated mode, a storage device detecting module for detecting whether an available storage device is connected to the interface means when the dedicated mode is switched to the normal mode by the mode switching module, and a normal mode inhibiting module for inhibiting switching to the normal mode when an available storage device is detected by the storage device detection module.

To attain the above object, in an eighth aspect of the present invention, there is provided a computer-readable storage medium for storing a control program for controlling an electronic apparatus comprising operating means for inputting an operation by a user and interface means for enabling access to a storage device, the electronic apparatus being capable of executing, separately from a normal mode, a dedicated mode in which a particular processes including accessing the storage device is performed, the control program comprising a mode switching module for performing switching between the normal mode and the dedicated mode, a storage device detecting module for detecting whether an available storage device is connected to the interface means after the dedicated mode is switched to the normal mode by the mode switching module, and a normal mode inhibiting module for inhibiting operation through the operating means in the normal mode when an available storage device is detected by the device detection module.

According to the present invention, if a user who has used the apparatus in a dedicated mode forgets to remove a storage device when switching from the dedicated mode to a normal mode, the switching to the normal mode or operation in the normal mode is inhibited, making it possible to cause the user to notice that he has failed to remove the storage device. Thus, it is possible to securely prevent a user from forgetting to remove a storage device and enhance data security.

The above and other objects, features, and advantages of the invention will become more apparent from the following detailed description taken in conjunction with the accompanying with drawings.

DETAILED DESCRIPTION OF THE PREFERRED EMBODIMENTS

The present invention now will be described in detail with reference to drawings showing a preferred embodiment thereof.

Figure 1:
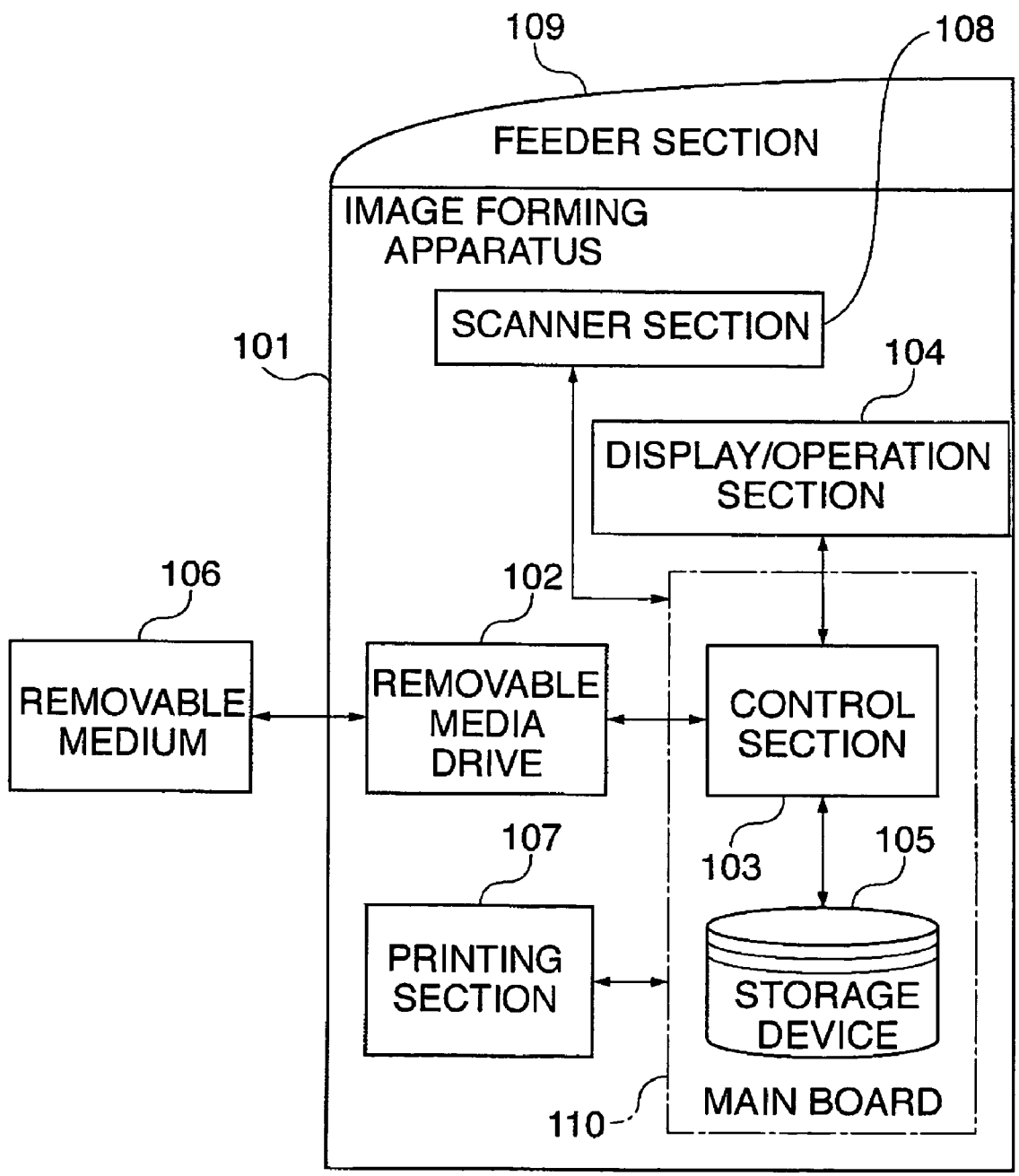
FIG. 1 is a block diagram schematically showing the configuration of an image forming apparatus as an electronic apparatus according to a first embodiment of the present invention.

FIG. 1 is a block diagram schematically showing the configuration of an image forming apparatus as an electronic apparatus according to a first embodiment of the present invention.

As shown in FIG. 1, this image forming apparatus 101 is configured, for example, by a digital copying machine and is provided with a removable media drive 102, a control section 103, a display/operation section 104, a nonvolatile storage device 105, a printing section 107, and a scanner section 108. The control section 103 and the storage device 105 are mounted on a main board 110.

The removable media drive 102 is a drive capable of reading/writing a removable medium 106 and is incorporated in the image forming apparatus 101. As examples of the removable medium 106, there can be mentioned an MO (Magneto-Optical) disk, FD (floppy (registered trademark) disk), ZIP disk, CD (Compact Disk), DVD (Digital Versatile Disk), SD (Secure Digital) memory card, memory stick, CF (Compact Flash) and the like.

The control section 103 controls operation of reading/writing the removable medium 106 or the storage device 105, execution of the firmware of the image forming apparatus 101, display of images on the display panel of the display/operation section 104, and detection of input from operation keys and the like.

The display/operation section 104 is configured by a touch panel and is capable of displaying a desired image similarly to a common display. The image forming apparatus 101 can be operated by a user touching the screen. Though a display section and an operation section are provided in one unit in the present embodiment, they may be separately provided. That is, a configuration may be also possible in which a user interface typified by a mouse or a keyboard may be provided separately from a common display.

The storage device 105 is configured by a hard disk drive, which is an auxiliary storage device, and a main memory, and there are stored therein various digital data such as control programs (including control codes based on the flowcharts shown in FIGS. 3 and 4 to be described later) and image data. The scanner section 108 reads an original image and provides the read image data to the printing section 107. A feeder section 109 automatically sets the original whose image is to be read at the reading position of the scanner section 108. The printing section 107 forms an image based on the image data supplied from the scanner section 108, on a sheet fed from a sheet feeding cassette not shown.

Figure 2:
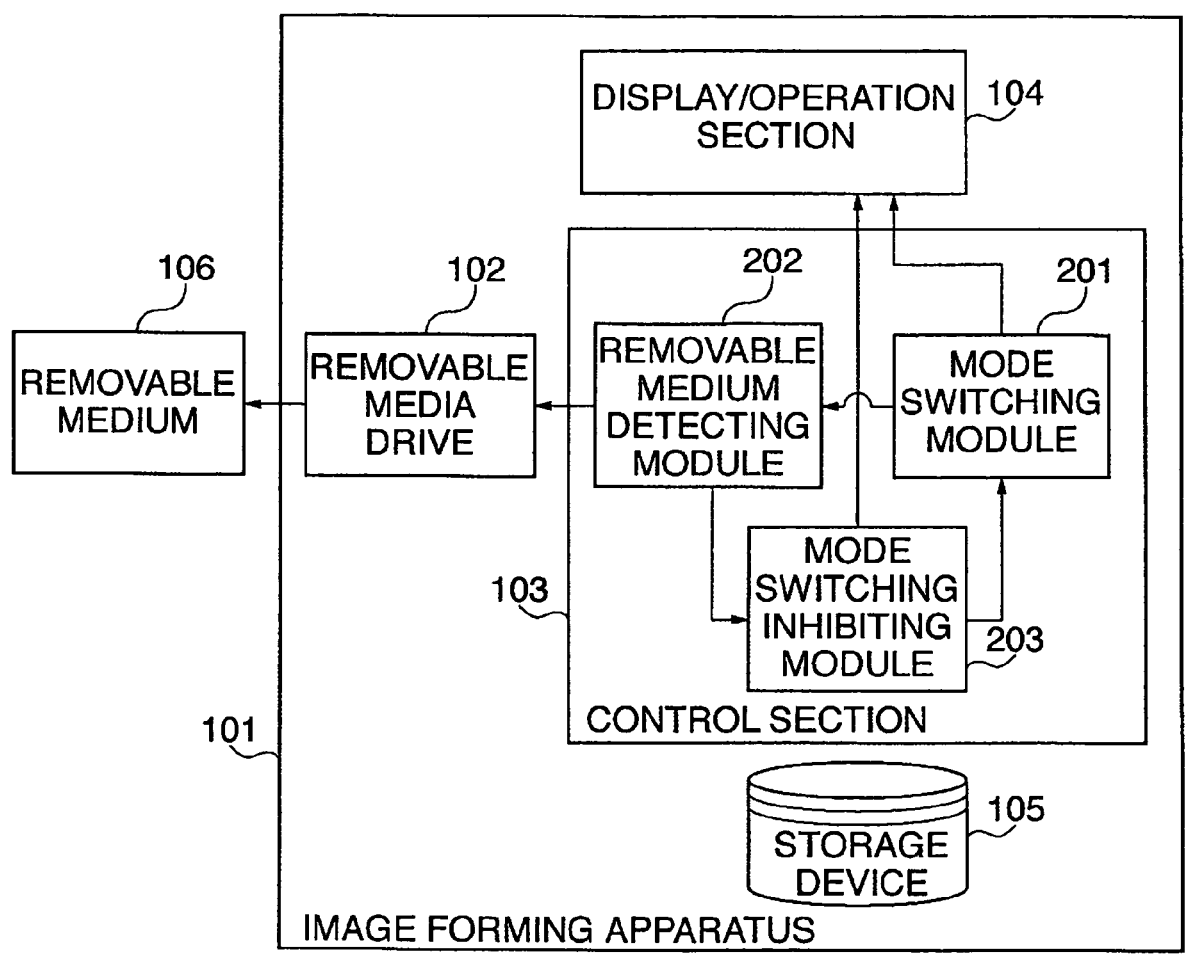
FIG. 2 is a block diagram showing characteristic modules contained in a control section in FIG. 1.

FIG. 2 is a block diagram showing characteristic modules contained in the control section 103 in FIG. 1, and the arrows in the figure show use relations among the modules.

In FIG. 2, the control section 103 is provided with a mode switching module 201, a removable medium detecting module 202 and a mode switching inhibiting module 203, as characteristic modules of the present embodiment.

The mode switching module 201 is a module for switching between a normal mode to be used by general users and a service mode dedicated to service persons. In the service mode, a service person can perform various processes for performing maintenance and/or condition inspection of the image forming apparatus 101. In that case, an operation of writing digital data to the removable medium 106 and/or an operation of reading digital data from a removable medium 106 is performed differently from the case of data writing/reading operations in the normal mode. Switching from the normal mode to the service mode is performed, for example, in response to a predetermined combination of buttons (not shown) which are provided in the display/operation section 104 being depressed by the user. Switching from the service mode to the normal mode is performed, for example, in response to a reset button (not shown) provided in the image forming apparatus 101 being operated by the user.

The removable medium detecting module 202 is a module for detecting that a removable medium 106 compatible to the removable media drive 102 is inserted. In this detection process, particular communication is performed with the removable medium 106, and it is determined whether or not the removable medium 106 is available for data writing/reading (to be described later with the use of FIG. 6).

The mode switching inhibiting module 203 is a module for performing control to prevent execution of mode switching from the service mode to the normal mode, if the mode switching module 201 attempts to carry out such mode switching in a state where it has been determined by the removable medium detecting module 202 that an available removable medium 106 is inserted.

Next, description will be made on the operation of updating firmware with the use of firmware data stored in a removable medium 106, in the image forming apparatus 101 configured as described above.

Figure 3:
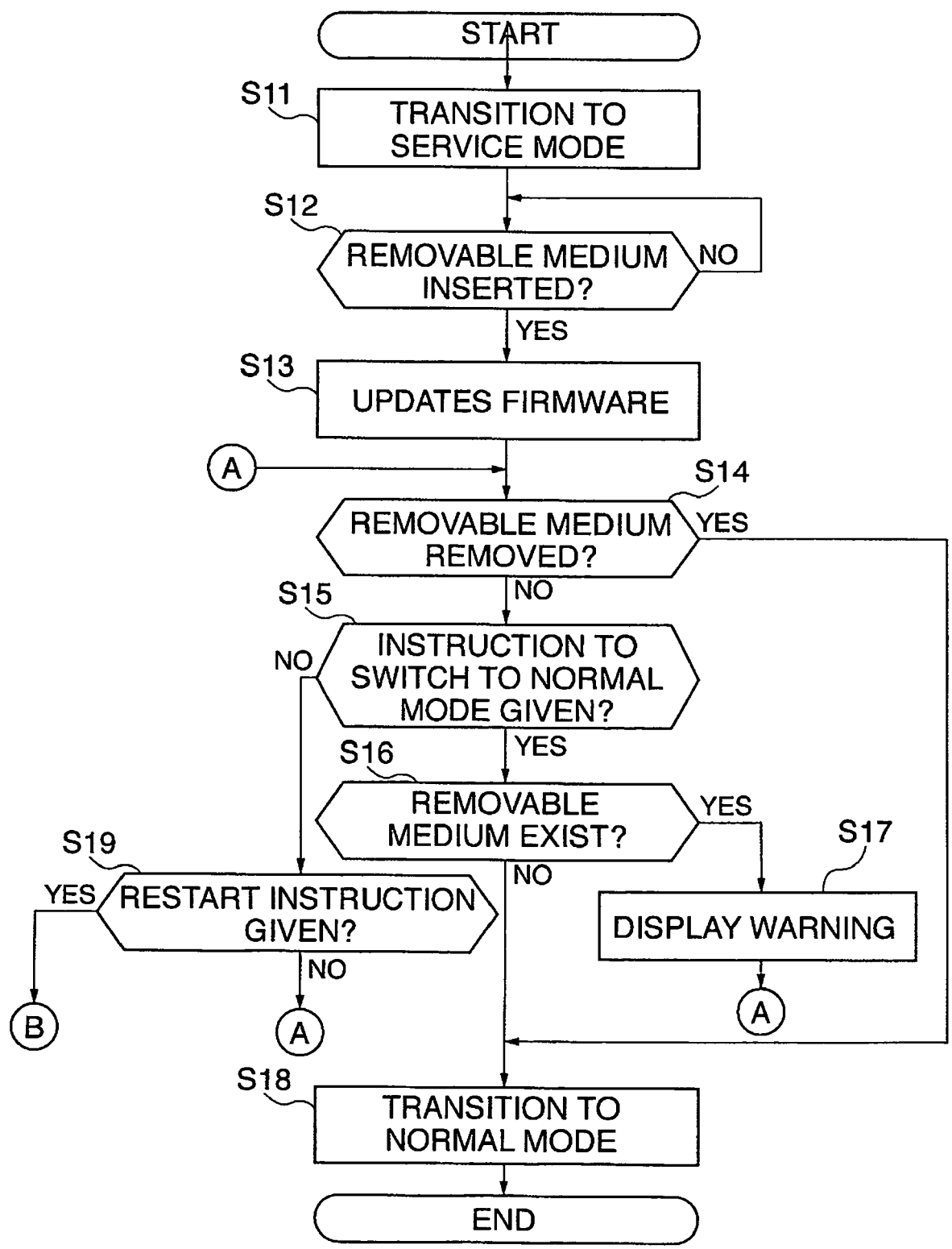
FIG. 3 is a flowchart showing a process for updating firmware of the image forming apparatus shown in FIG. 2.
Figure 4:
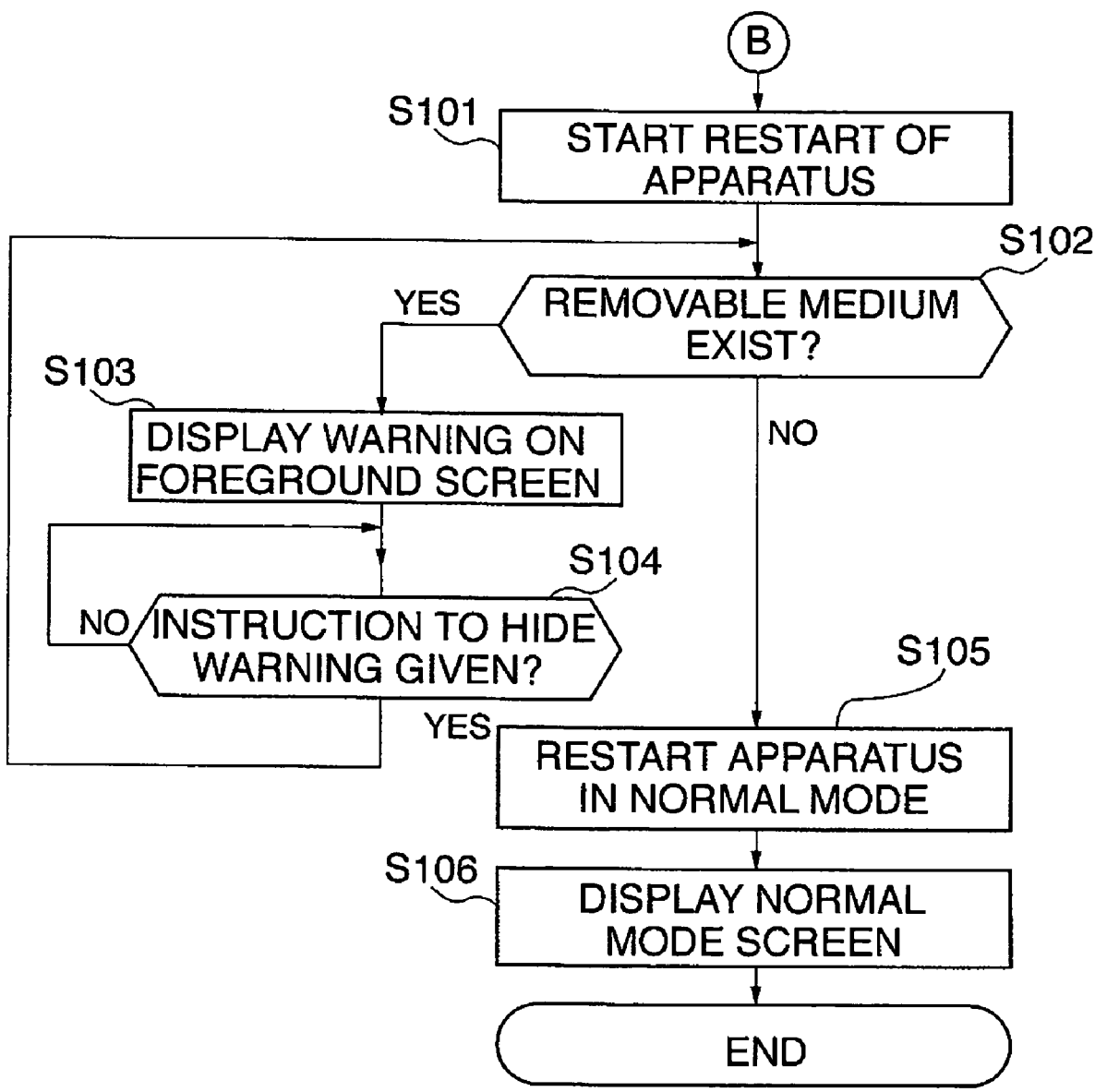
FIG. 4 is a flowchart showing the continuation of the updating process in FIG. 3.

FIG. 3 is a flowchart showing a process for updating firmware of the image forming apparatus shown in FIG. 2, and FIG. 4 is a flowchart showing the continuation of the updating process in FIG. 3.

(A) Flow for the case where user does not forget to remove removable medium

First, description will be made on a correct operation procedure (the case where the user does not forget to remove a removable medium) which is carried out for updating firmware.

Figure 5:
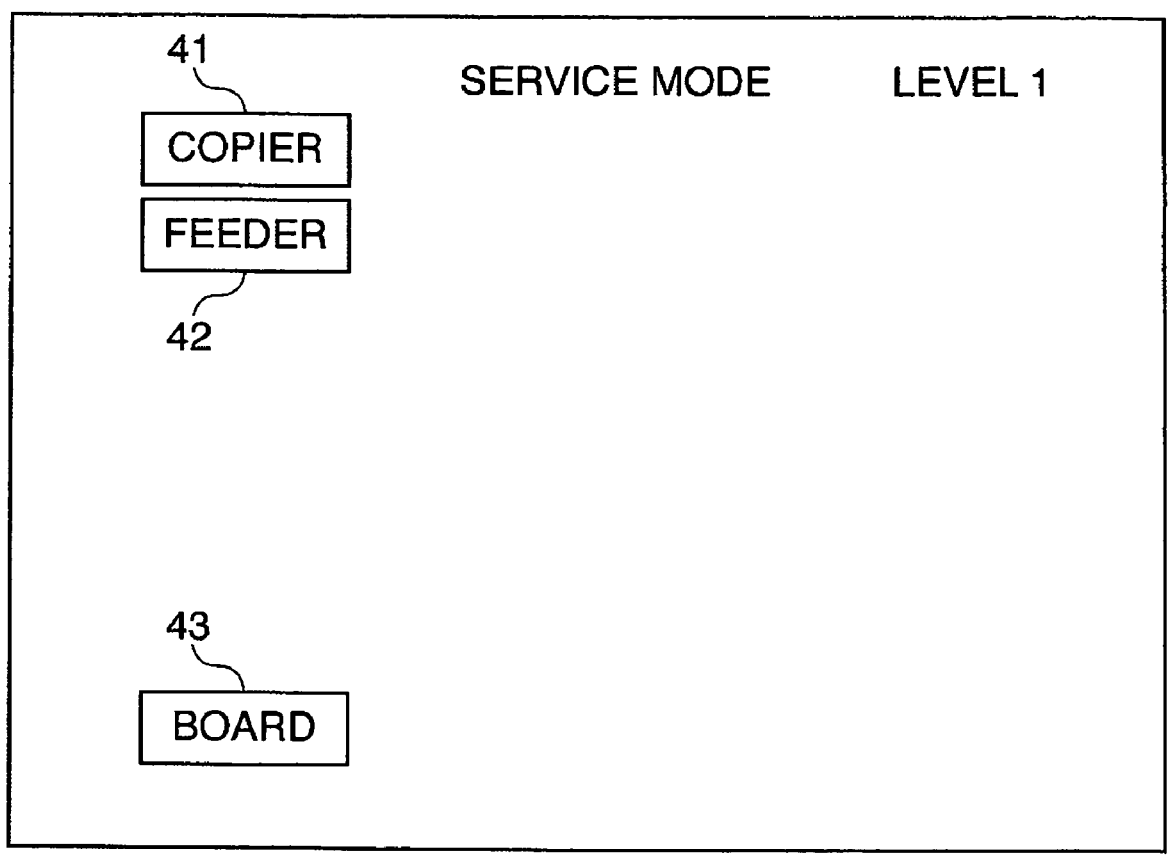
FIG. 5 shows an example of a display screen to be displayed in a service mode.

When a service person updates the firmware of the image forming apparatus 101, the normal mode is changed to the service mode first by the mode switching module 201 at step S11. In the service mode, various processes are carried out to enable the service person to perform maintenance or condition inspection of the image forming apparatus 101. FIG. 5 shows an example of a display screen to be displayed on the display/operation section 104 in the service mode.

In FIG. 5, a "COPIER" button 41 is a button for switching to a screen for performing checking or maintenance related to a printing function, and a "FEEDER" button 42 is a button for transitioning to a screen for performing checking or maintenance of a sheet feeder. A "BOARD" button 403 is a button for switching to a screen for displaying information about a board connected to a PCI extended slot of the main board 110.

At the next step S12, it is determined by the removable medium detecting module 202 whether or not the service person has inserted a removable medium 106 compatible to the removable media drive 102. In this removable medium 106, firmware to be installed in the image forming apparatus 101 is stored.

Figure 6:
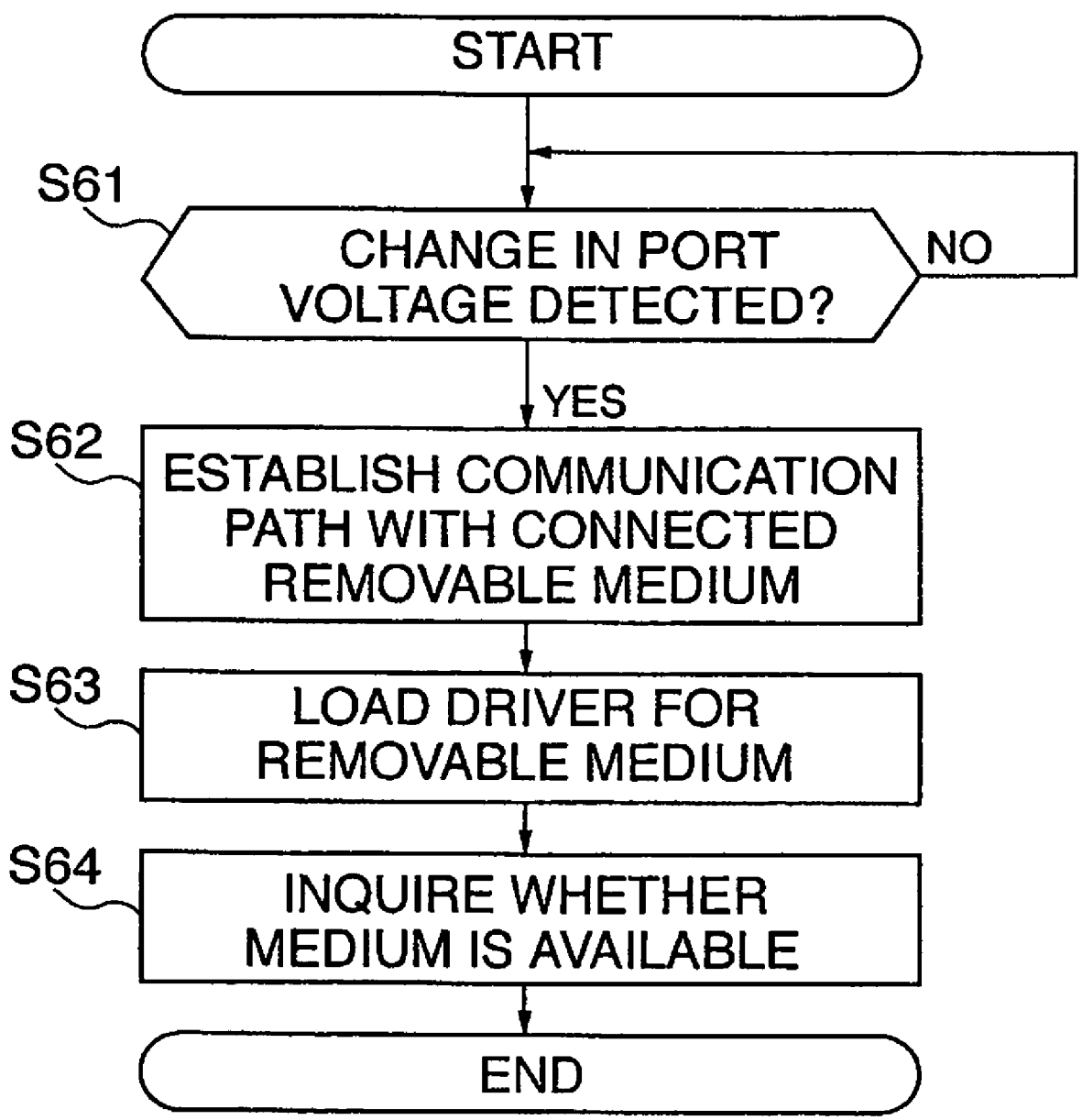
FIG. 6 is a flowchart showing a process for detecting insertion of a removable medium shown in FIG. 2.

Here, the details of the process at step S12 (a removable medium insertion detection process) will be described with reference to FIG. 6. FIG. 6 is a flowchart showing process for detecting insertion of the removable medium 106 shown in FIG. 2. The removable medium insertion detection process may be continuously performed by repeating the flow of FIG. 6 or may be performed only when required in response to an instruction from a user.

First, at step S61 in FIG. 6, it is determined whether or not a change in port voltage caused by the removable medium 106 being inserted has been detected. Specifically, when the removable medium 106 is inserted into the removable media drive 102, the port voltage concerned changes to a high level by the pull-up resistance or the like of the removable medium 106. Thereby, the removable medium detecting module 202 can detect that the removable medium 106 has been inserted into the removable media drive 102.

When a change in the port voltage is detected, the removable medium detecting module 202 establishes a communication path with the inserted removable medium 106 (step S62), and loads a driver for the removable medium 106 (step S63).

After that, an inquiry is periodically made to the inserted removable medium 106 as to whether the removable medium 106 is in an available state (step S64). If it is available, information indicating that the removable medium 106 has been detected as an available removable medium (hereinafter referred to as medium detection information) is held in the storage device 105.

Figure 7A:
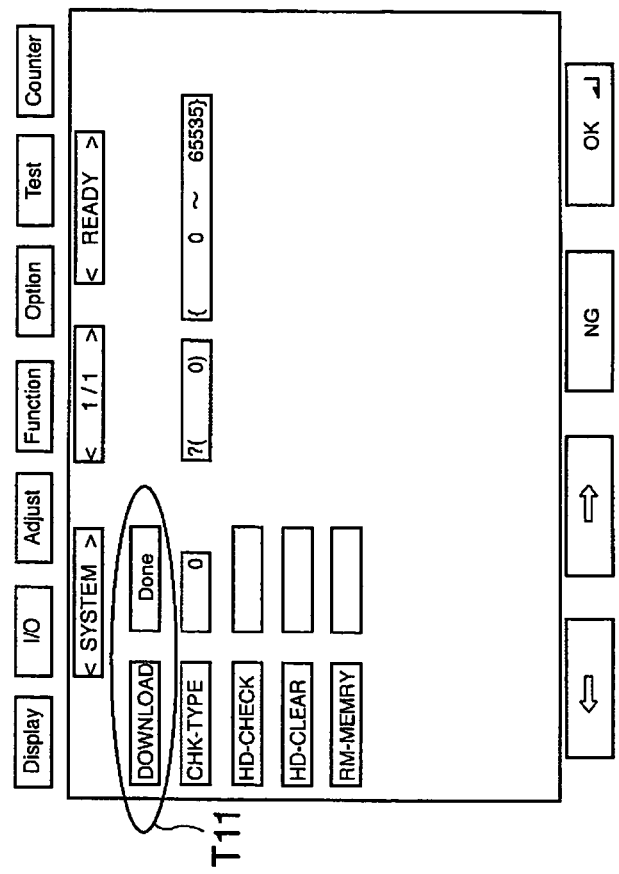
FIG. 7A shows an example of a display screen to be displayed during the firmware update process.
Figure 7B:
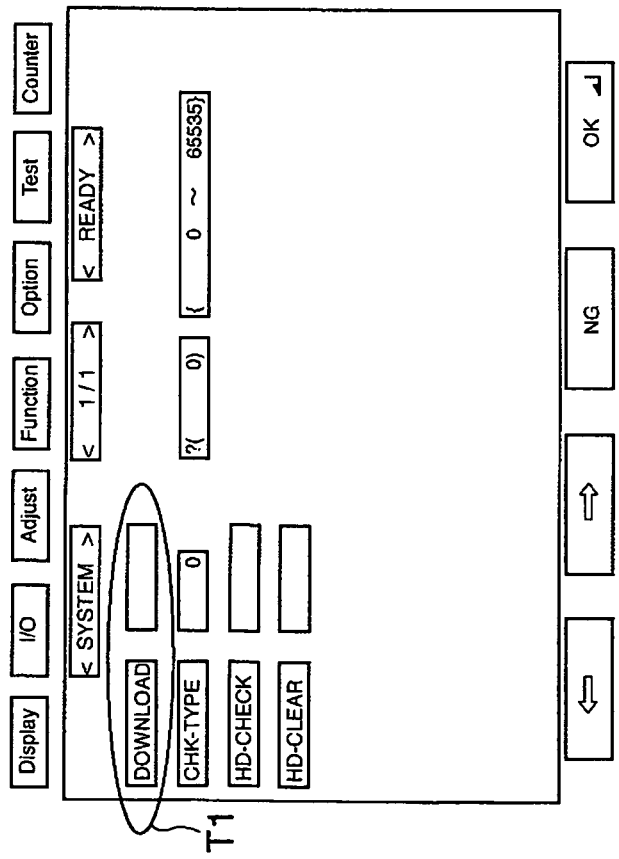
FIG. 7B shows an example of a display screen to be displayed when a firmware download process is completed.

Returning to FIG. 3, a firmware update process is performed at step S13. Execution of the firmware update process may be triggered by the insertion of an available removable medium 106 being detected by the removable medium detecting module 202 or may be instructed by the service person through the display/operation section 104. In the firmware update process, a process for downloading firmware from the removable medium 106 to the storage device 105 in the image forming apparatus 101 (a "DOWNLOAD" process) is started (T1 in FIG. 7A). When the download is completed, "Done" is displayed on the display/operation section 104 as shown at T11 in FIG. 7B.

When the predetermined operation (update of firmware) is finished as described above, the service person usually switches from the service mode to the normal mode without fail. This is because functions executable in the normal mode and in the service mode are different and it is necessary to avoid a general user from performing unnecessary processes.

If the service person performs an expected correct operation procedure, he removes the removable medium 106 from the removable media drive 102 for the sake of security, before switching to the normal mode.

Figure 8A:
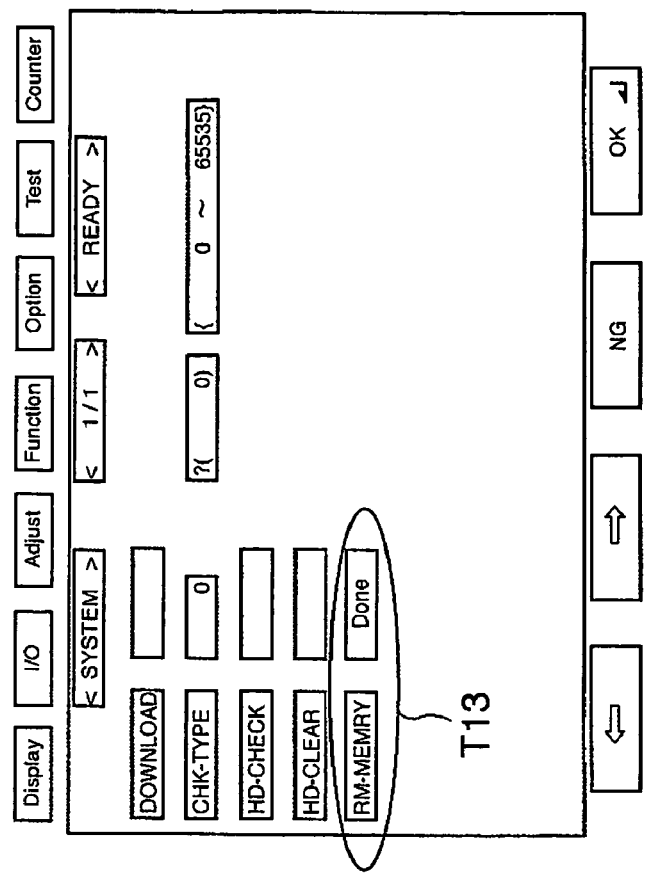
FIG. 8A shows an example of a display screen to be displayed during removal of a removable medium.
Figure 8B:
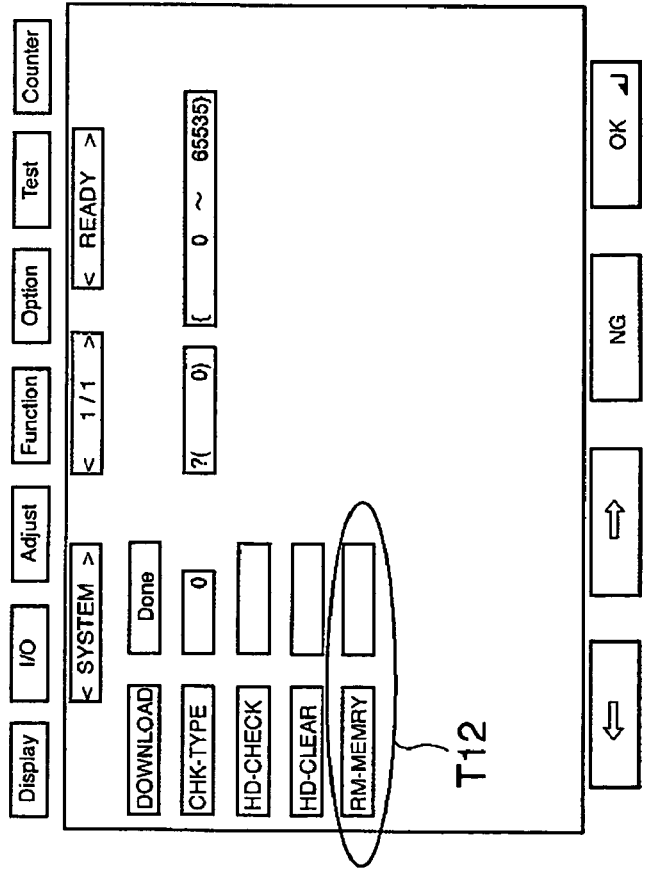
FIG. 8B shows an example of a display screen to be displayed when a "RM-MEMORY" process is completed.
Figure 9:
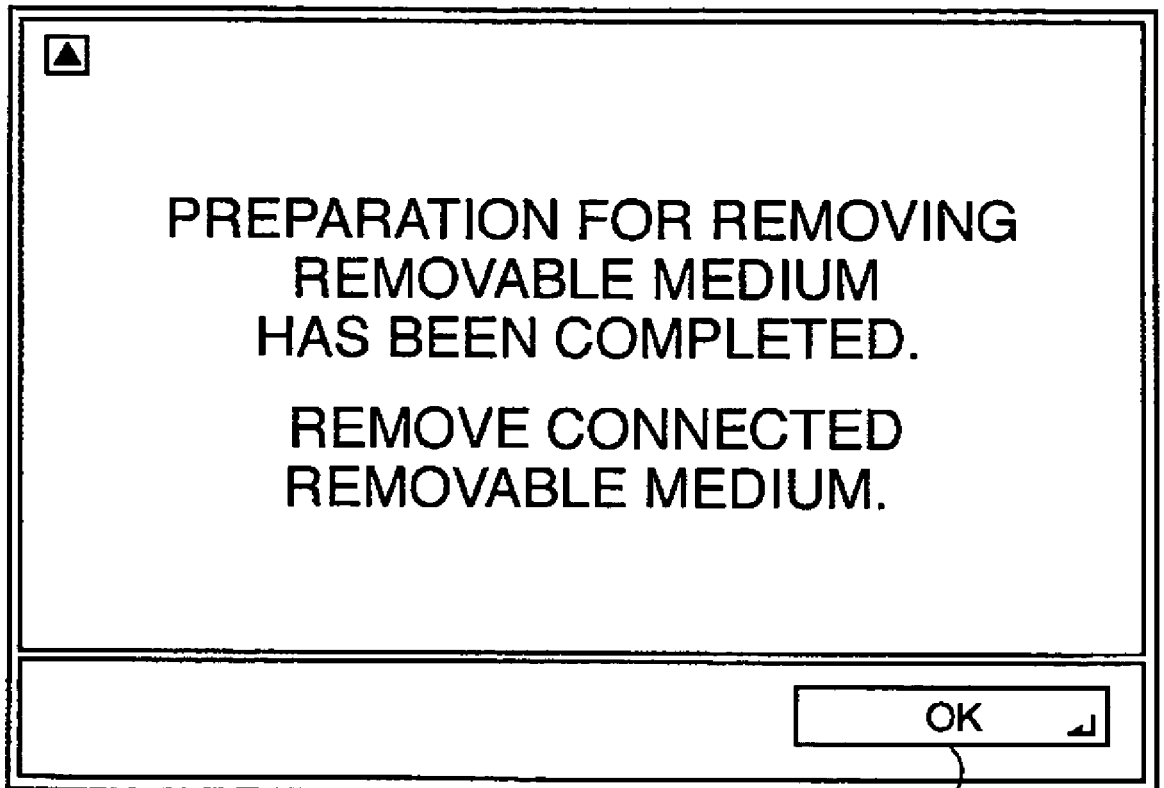
FIG. 9 shows an example of a display screen to be displayed during the removal of removable medium.
Figure 10:
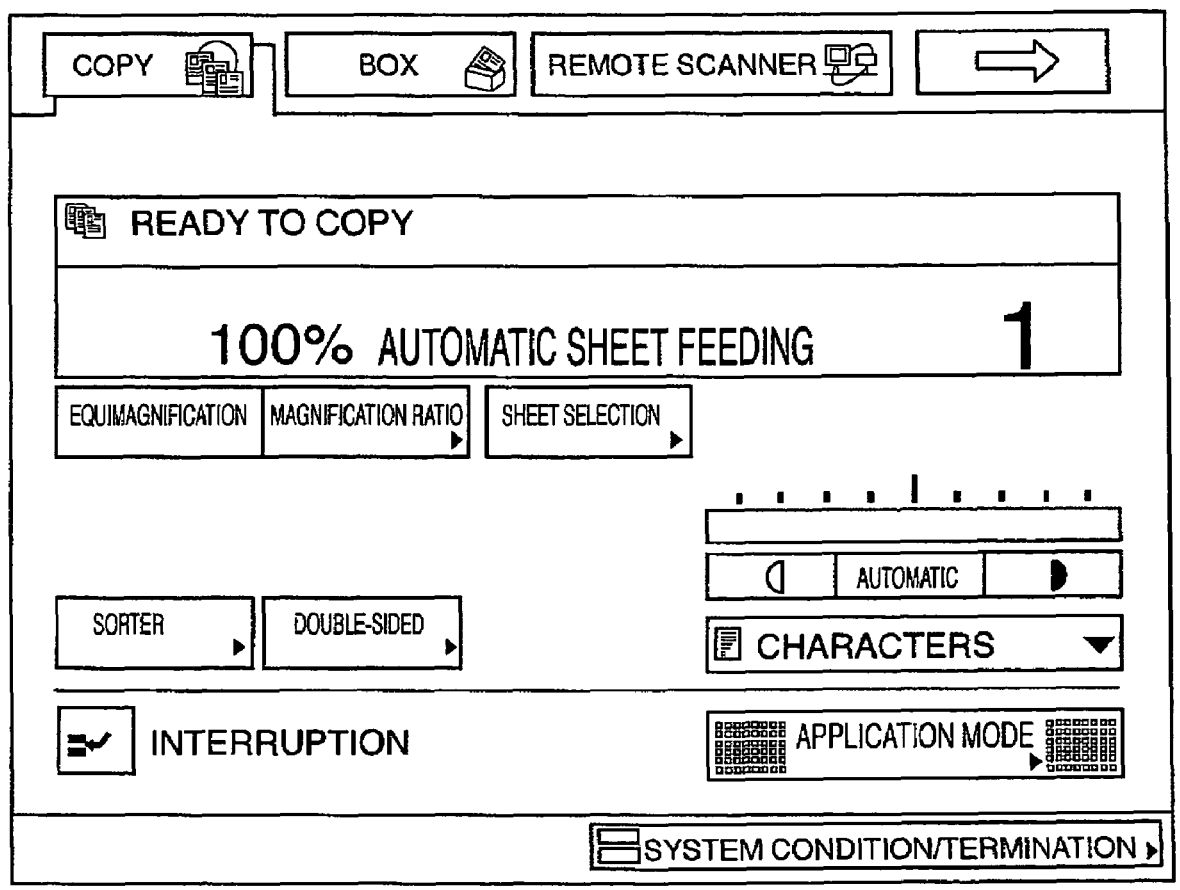
FIG. 10 shows an example of a display screen to be displayed in a normal mode.

Prior to the execution of removal of the removable medium, a screen as shown in FIG. 8A is displayed on the display/operation section 104, an indication "RM-MEMORY" is highlighted in the screen, and a "RM-MEMORY" process (T12 in FIG. 8A) is performed. When the "RM-MEMORY" process is completed, "Done" is displayed as shown at T13 in FIG. 8B. Then, a message prompting that the removable medium 106 should be removed, as shown in FIG. 9, is further displayed on the screen. Then, when the service person removes the removable medium 106 from the removable medium drive and presses an "OK" button 71 on the screen shown in FIG. 9, it is determined that the removable medium 106 has been removed (YES to step S14). The mode is switched to the normal mode, and display of the display/operation section 104 is changed to a normal mode screen as shown in FIG. 10 (step S18). Then, the service person checks the operation of the image forming apparatus 101 after the firmware update process.

Update of firmware with the use of a removable medium 106 is realized by the procedure described above.

(B) Flow for the case where user forgets to remove removable medium

Next, referring to FIG. 3, description will be made on the flow in the case where switching from the service mode to the normal mode is attempted while a removable medium 106 is not removed.

It is assumed that the processes from steps S11 to S13 described above have been finished, so that the firmware update has been completed and the service mode is established.

If the service person presses the "OK" button 71 on the screen shown in FIG. 9 without removing the removable medium 106 and pressing the reset button provided in the image forming apparatus 101, then it is determined that an instruction to switch from the service mode to the normal mode has been made without the removable medium being removed (NO to step S14; YES to step S15), and the process proceeds to step S16.

At step S16, it is determined whether or not an available removable medium 106 exists in the removable media drive 102 based on the medium detection information which has been stored in the storage device 105 as a result of the inquiry (step S114). If an available removable medium 106 exists, there is a possibility that the service person has failed to remove the removable medium 106.

Figure 11A:
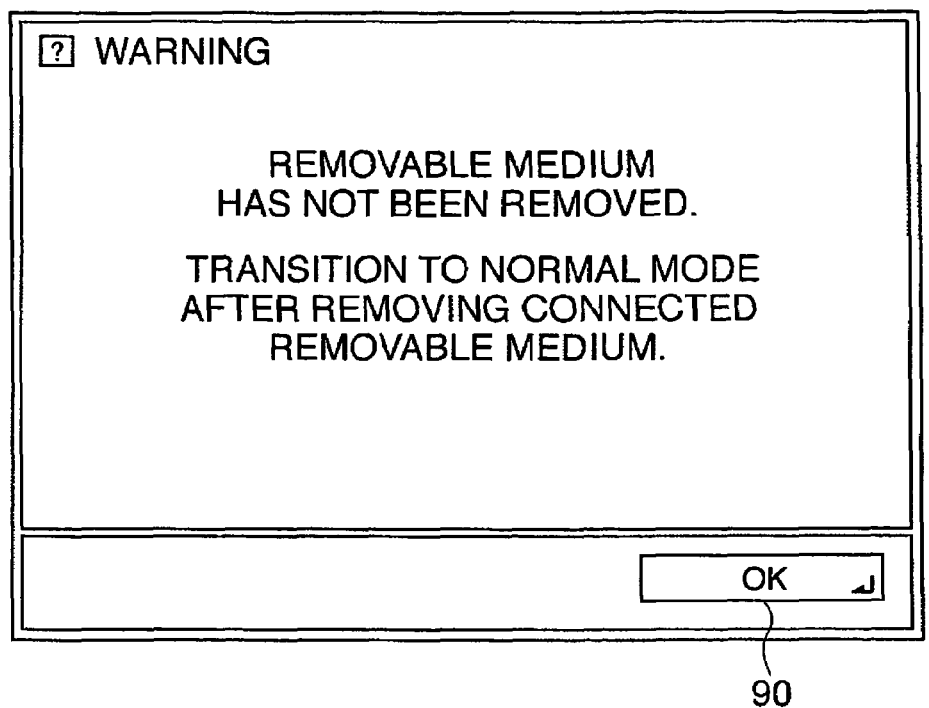
FIG. 11A shows an example of a warning display to be displayed on the entire screen of the display/operation section.
Figure 11B:
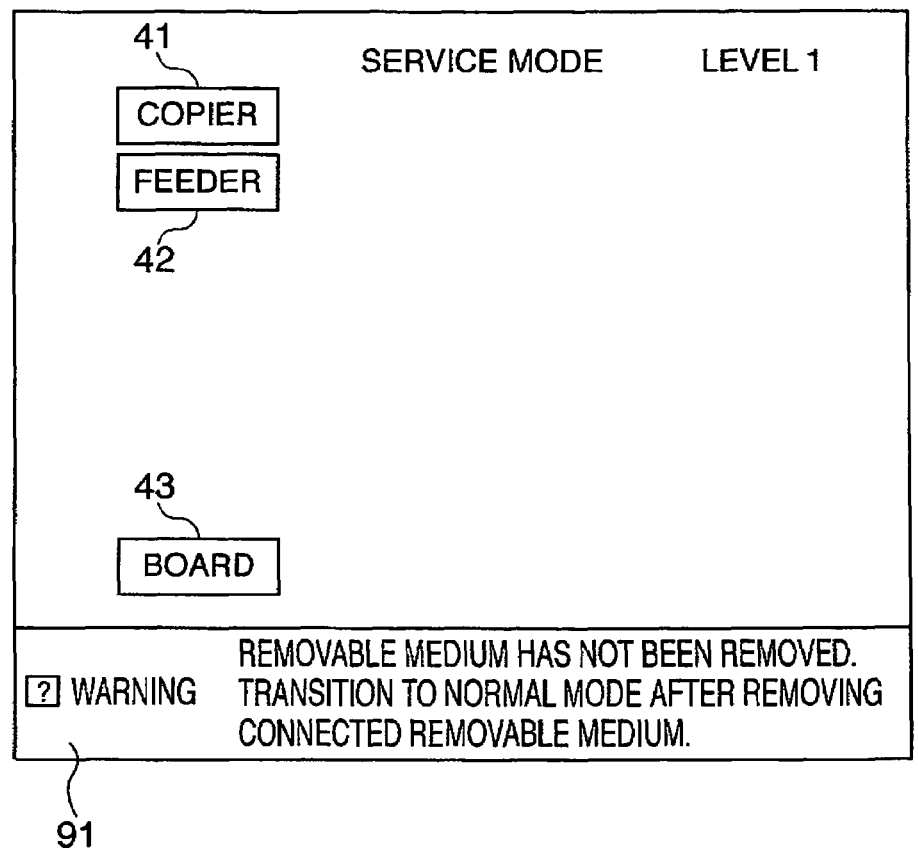
FIG. 11B shows an example of a warning display to be displayed on a part of the screen of the display/operation section.

Then, if a removable medium 106 exists in the removable media drive 102, a warning is displayed at step S17 to instruct the service person to remove the removable medium 106. The warning is displayed, for example, on the entire screen of the display/operation section 104 as shown in FIG. 11A. By pressing an "OK" button 90, the process returns to step S14, and the processes at and after step S14 are repeated. By repeating these processes, switching from the service mode to the normal mode is inhibited until the service person removes the removable medium 106. It is also possible to display the warning on a part of the screen of the display/operation section 104 at step S17 as shown in FIG. 11B.

On the other hand, if it is determined at step S16 that an available removable medium 106 does not exist in the removable media drive 102, then the process proceeds to step S18, and switching to the normal mode is performed. Thereby, the service person can perform a desired operation test in the normal mode.

As described above, if an available removable medium 106 is detected by the removable medium detecting module 202 when switching from the service mode to the normal mode is performed by the mode switching module 201, a warning is displayed and switching to the normal mode is inhibited. Thereby, even if a service person forgets to remove a removable medium 106 after finishing the firmware update operation, he can notice it. Thus, it is possible to securely prevent the service person from forgetting to remove the removable medium 106.

(C) Flow for the case where restart is performed

Next, description will be made on the flow in the case where the image forming apparatus 101 has been restarted without switching to the normal mode after completion of firmware update with reference to FIG. 3.

At step S15 in FIG. 3, if it is determined that an instruction to switch to the normal mode has not been given, then the process proceeds to step S19 where it is determined whether or not an instruction to restart the image forming apparatus 101 has been given. If it is determined at step S19 that the restart instruction has been given, then the process proceeds to step S101 in FIG. 4, where the image forming apparatus 101 is restarted. It should be noted that the image forming apparatus 101 is configured so that the mode is automatically switched to the normal mode after the apparatus is restarted.

At the next step S102, it is determined whether or not an available removable medium 106 exists in the removable media drive 102 based on the medium detection information which has been stored in the storage device 105 as a result of the inquiry (step S114), similarly to the above described step S16 in FIG. 3. If an available removable medium 106 exists, there is a possibility that the service person has failed to remove the removable medium 106.

Therefore, at the subsequent step S103, a warning is displayed to instruct the service person to remove the removable medium 106. In this case, even if restart of the image forming apparatus 101 has been completed so that operation in the normal mode is enabled, the condition in which the functions of the normal mode are disabled is still held. For example, a warning may be displayed on the foreground of the screen of the display/operation section 104. Here, the foreground of the display/operation section 104 means the hithermost dialog display in a modal dialog box. When the warning is displayed on the foreground of the display/operation section 104, a user cannot operate the image forming apparatus 101 using the subsequent display screens, and consequently, he cannot make operation in the normal mode.

When the service person gives an instruction to hide the warning display (step S104), the processes at and after step S102 are repeated again in response to such instruction. Due to this repetition process, the service person cannot use the image forming apparatus 101 in the normal mode unless he removes the removable medium 106.

If it is determined at step S102 that an available removable medium 106 does not exist, then the image forming apparatus 101 is restarted in the normal mode (step S105), and a normal mode screen as shown in FIG. 10 is displayed (step S106). Thereby, the user can make operation in the normal mode.

As described above, even if a service person restarts the image forming apparatus 101 without switching from the service mode to the normal mode when having performed update of firmware from a removable medium 106, it is possible to prevent the service person from forgetting to remove the removable medium 106.

In the flowchart in FIG. 4, if the apparatus is restarted without removing the removable medium, steps S102 to S104 are looped until the service person gives an instruction to hide the warning display (step S104). Thus, for example, if the service person instructs restart of the apparatus and then leaves the apparatus during the restart forgetting the existence of the removable medium, the apparatus continues to display the warning.

In such a case, for example, control may be performed such that the warning display is hidden when a predetermined time is counted up by a timer, which starts to count the predetermined time at the same time as the warning display starts at step S103 in FIG. 4, irrespective of whether or not an instruction to hide the warning display has been inputted at step S104, the content of the removable medium is erased, and then the mode transitions to the normal mode. In this case, if the count time of the timer is set long enough, it is clearly determined that the service person forgot to remove the removable medium, and therefore, it will not be a problem that the content of the removable medium is erased. Thereby, it is possible to prevent the warning from being displayed endlessly, with the removable medium kept attached to the apparatus for a long time.

Though, in this embodiment, the process for detecting insertion of a removable medium 106 is performed after the image forming apparatus 101 transitions to the service mode, it is also possible to perform the insertion detection process first and then cause the mode to transition to the service mode after detection of a removable medium 106.

Though, in this embodiment, a removable medium 106 is removed after the firmware update process is performed, it is also possible to copy necessary data from the removable medium 106 to the storage device 105 and perform update of firmware with the use of the data copied to the storage device 105 after removing the removable medium 106.

Next, a second embodiment of the present invention will be described.

In the second embodiment, operation in the normal mode is inhibited by displaying a warning on the foreground of the display/operation section 104 until a removable medium 106 is removed, though switching to the normal mode is performed inside the system. This embodiment is different from the first embodiment only in that the firmware update process is changed from the above described flow in FIG. 3 to the flow shown in FIG. 12, and other points are the same as the first embodiment.

Figure 12:
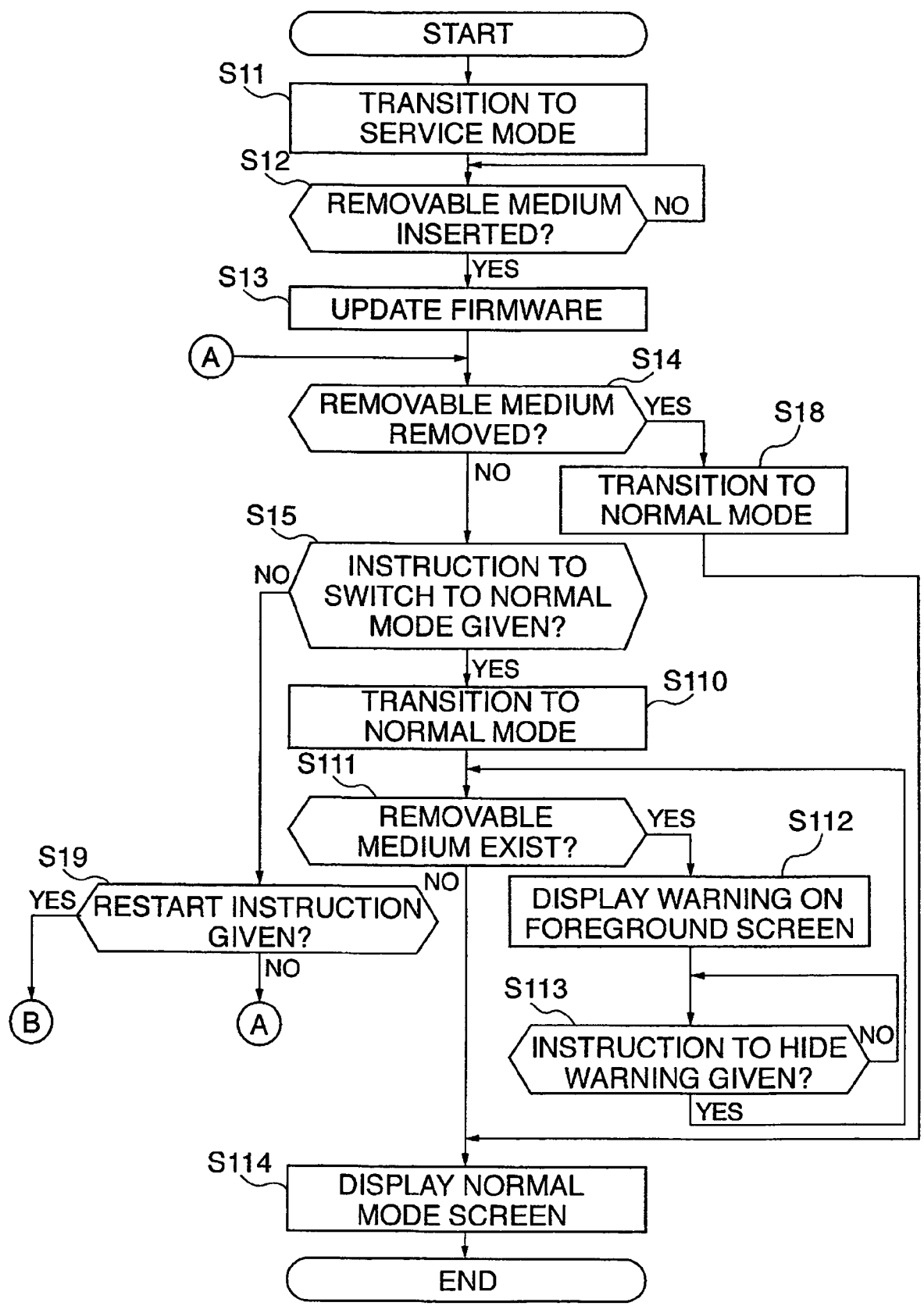
FIG. 12 is a flowchart showing a process for updating firmware of an image forming apparatus as an electronic apparatus according to a second embodiment of the present invention.

FIG. 12 is a flowchart showing a process for updating firmware of an image forming apparatus as an electronic apparatus according to this embodiment. The process in FIG. 12 is basically the same as the process in FIGS. 3 and 4. The same reference numerals are given to the same steps as those in FIGS. 3 and 4, and duplicated description of the steps will be omitted. Only different points will be described below.

In this embodiment, after the above described processes from step S11 to step S13 are finished, if it is determined that a removable medium 106 has been removed (YES to step S14), the flow proceeds to step S15. If it is determined at step S15 that an instruction to switch to the normal mode has been given, then the apparatus transitions to the normal mode first (step S110). After that, it is determined whether or not an available removable medium 106 exists in the removable media drive 102 in a manner similar to that of step S16 in FIG. 3 (step S111).

If an available removable medium 106 exists, there is a possibility that a service person has forgotten to remove the removable medium 106. Therefore, at the subsequent step S112, a warning is displayed on the foreground of the display/operation section 104 to instruct the service person to remove the removable medium 106.

Next, when it is instructed by an input operation or the like by the service person to hide the warning display (step S113), the processes of step S111 and the subsequent steps are repeated again in response to this instruction. If it is determined at step S111 that an available removable medium 106 does not exist, then a normal mode screen as shown in FIG. 10 is displayed (step S114).

As described above, a warning is displayed on the foreground of the display/operation section 104 as far as a removable medium 106 is not removed, so that the service person cannot perform any operation in the normal mode through the display/operation section 104. Thereby, even if a service person forgets to remove a removable medium 106 after finishing firmware update work, he can notice it. Thus, it is possible to securely prevent the service person from forgetting to remove the removable medium 106.

In the following, a third embodiment of the present invention will be described.

Figure 13:
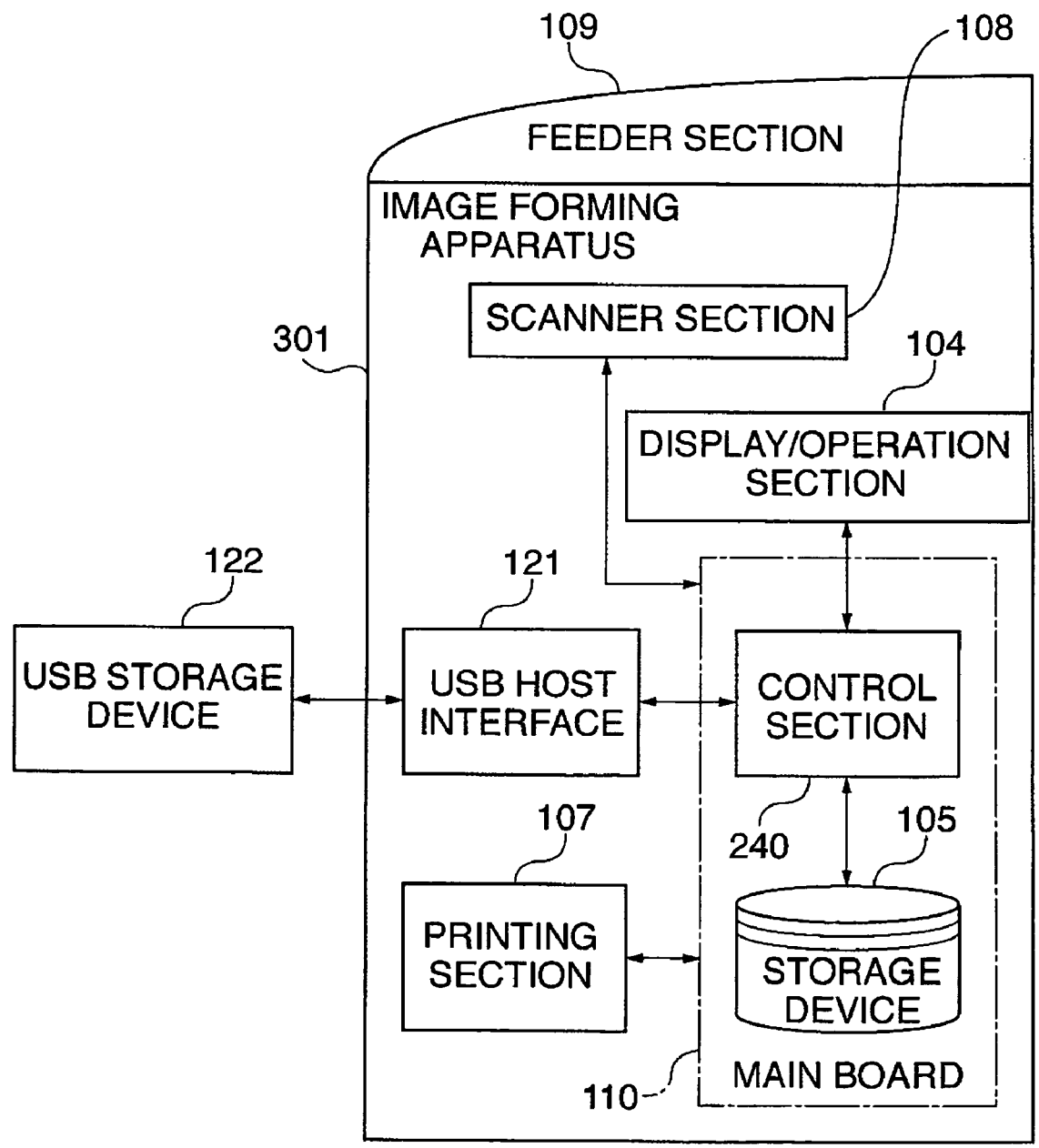
FIG. 13 is a block diagram schematically showing the configuration of an image forming apparatus as an electronic apparatus according to a third embodiment of the present invention.

FIG. 13 is a block diagram schematically showing the configuration of an image forming apparatus as an electronic apparatus according to the third embodiment of the present invention.

In the third embodiment, description will be made on the case where the firmware of an image forming apparatus with a USB host interface is updated with the use of firmware data stored in an external storage device provided with a USB host interface.

In FIG. 13, the hardware configuration of an image forming apparatus 301 is different from the configuration in FIG. 1 described above only in that the removable media drive 102 is replaced with a USB host interface 121. Accordingly, it is a USB storage device 122 provided with a USB interface that a user is to connect to the image forming apparatus 301. As the USB storage device 122, for example, a removable media drive that is compatible to a removable medium can be used in addition to a USB memory and a USB hard disk.

If a removable media drive that is connected to the USB host interface 121 for use is adapted only for insertion and removal of a removable medium, there is no substantial differences in construction and function between the image forming apparatus 301 of this embodiment and the apparatus 101 of the first embodiment described above. To clearly explain the features of this embodiment, description will be made on the case where a USB memory, or a USB hard disk is connected/disconnected. These are collectively referred to as a USB storage device.

Figures 14, 15:
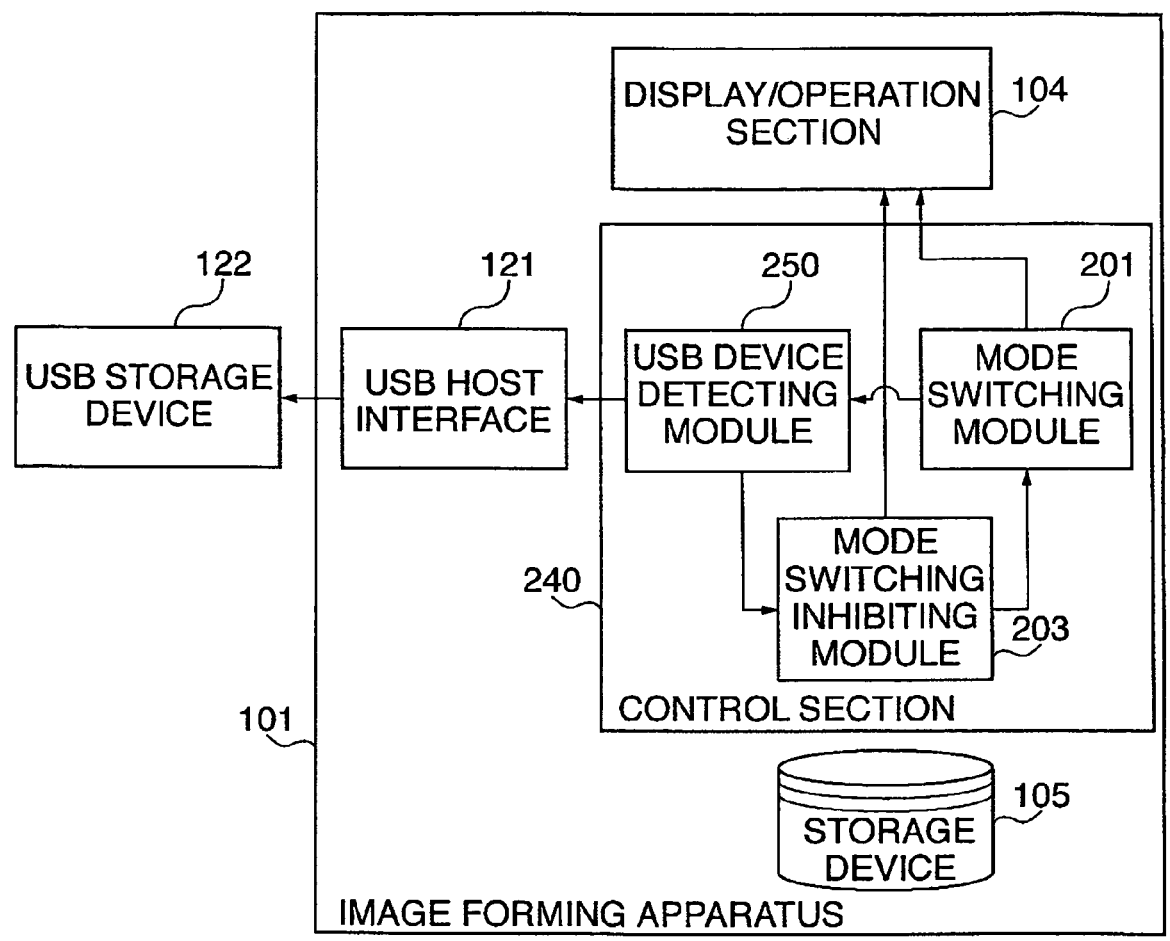
FIG. 14 is a block diagram showing characteristic modules contained in a control section in FIG. 13.
FIG. 15 shows the hierarchical structure of USB descriptor information.

FIG. 14 is a block diagram showing characteristic modules contained in a control section 240 in FIG. 13. The configuration of this embodiment is basically the same as that of the first embodiment described above. The same reference numerals are given to the same components, and duplicated description of the components will be omitted. Only different points will be described below.

The configuration of the control section 240 in FIG. 14 is different from that of the control section 103 in FIG. 2 in that a USB device detection module 250 is provided instead of the removable medium detecting module 202 in FIG. 2.

In FIG. 14, the USB device detection module 250 detects an available USB storage device, if any, which is connected to the USB host interface 121. Specifically, the USB storage device 122 is searched for from among USB devices connected to the interface 121, and it is determined whether the USB storage device 122 is in an available state.

The determination whether or not the connected USB device is a USB storage device is performed by referring to the class code at the sixth byte in an interface descriptor which is included in USB descriptor information of the USB device subjected to the determination.

FIG. 15 shows the hierarchical structure of the USB descriptor information. In FIG. 15, a symbol (1) means that one descriptor exists for one USB device, and a symbol (1:*) means that multiple descriptors exist for one higher descriptor.

The interface descriptor consists of nine pieces of one-byte information, wherein the first byte is bLength (size of the descriptor), the second byte is bDescriptorType (type of the descriptor), the third byte is bInterfaceNumber (identification number of the interface), the fourth byte is bAlternateSetting (value for selecting different setting), the fifth byte is bNumEndpoints (the number of end points), the sixth byte is bInterfaceClass (class code), the seventh byte is bInterfaceSubclass (subclass code), the eighth byte is bInterfaceProtocol (protocol code), and the ninth byte is interface (index to a string descriptor).

Here, description will be made on a USB device connection detection process to be performed by the USB device detection module 250 for detecting whether an available USB storage device 122 is connected to the USB host interface 121, with reference to FIG. 16.

Figure 16:
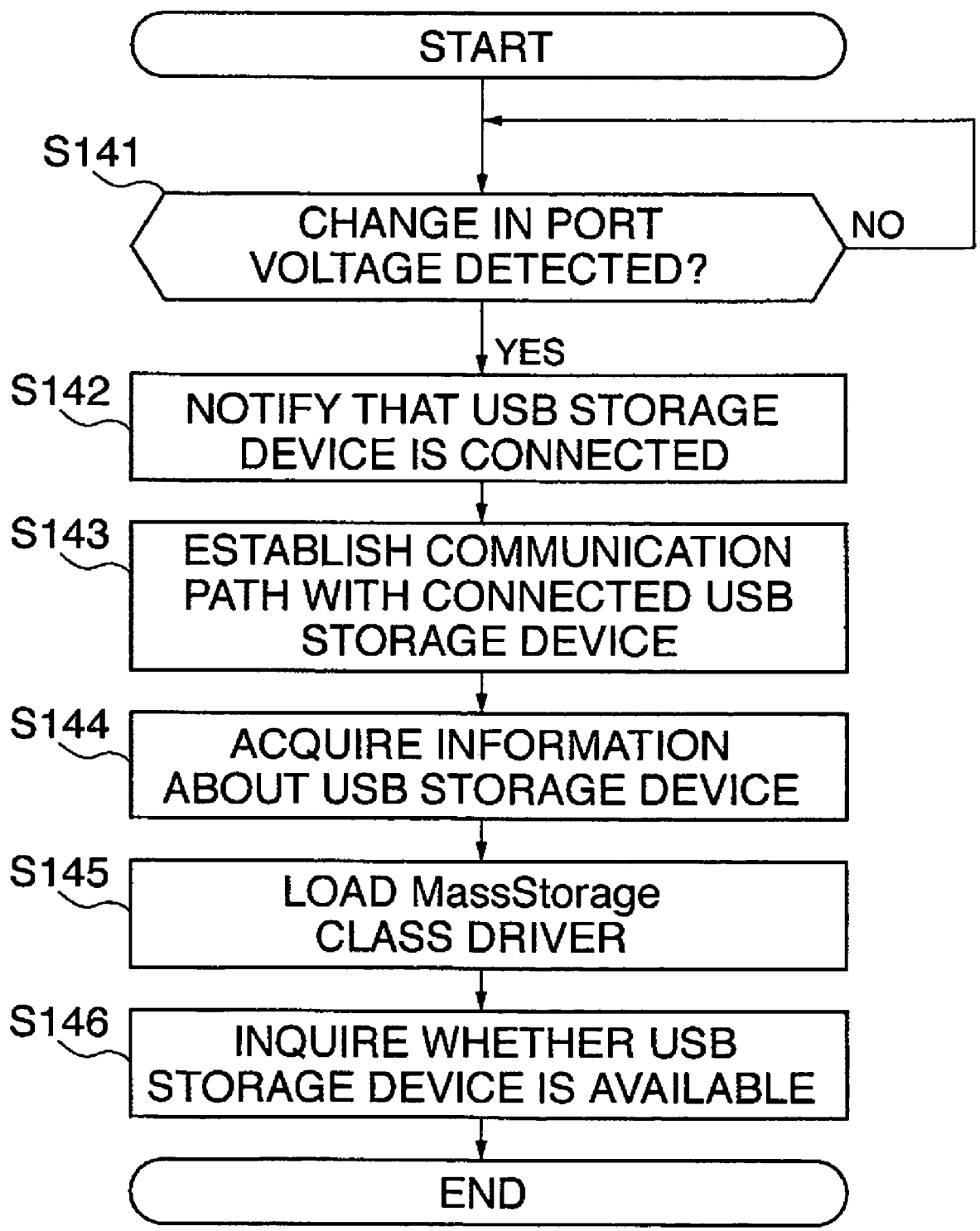
FIG. 16 is a flowchart showing a USB device connection detection process performed by the image forming apparatus shown in FIG. 13.

FIG. 16 is a flowchart showing a USB device connection detection process to be performed by the image forming apparatus shown in FIG. 13.

In FIG. 16, first, when the USB storage device 122 is connected to the USB host interface 121, the USB host interface 121 detects a change in port voltage (step S141). Next, the USB host interface 121 notifies the USB device detection module 250 that the device 122 is connected to the interface 121 (step S142).

After that, the USB device detection module 250 establishes a communication path with the connected USB storage device 122 (step S143), and acquires performance information (descriptor information) about the USB storage device 122 through the communication path (step S144). Then, it is determined that the connected device is a device in MassStorage class based on the acquired descriptor information. That is, if the above described class code (the value of bInterfaceClass of at offset 5 (at the sixth byte)) is 0x08, then it is known that the device is a MassStorage class device.

Next, a MassStorage class driver is loaded (step S145). After that, an inquiry is periodically made to the USB storage device 122 (step S146). As a result, if the device 122 is in an available state, device detection information is held in the storage device 105 as information indicating that the USB storage device 122 has been detected as an available device.

The firmware update process in this embodiment is basically the same as that of the first embodiment described with reference to FIGS. 3 and 4. The difference is that the removable medium 106 is replaced with the USB storage device 122. More specifically, for example, the removal of a removable medium 106 associated with step S14 is replaced with the removal of a USB storage device 122, and the USB storage device 122 is manually removed by a user after a process such as disk cache writing ("RM-MEMORY" process) is performed by the control section 240. Furthermore, the process at step S12 is changed to the detection process by the USB device detection module 250 as described with reference to FIG. 16, and accordingly, the processes at steps S16 and S102 are changed to the processes described above. Other processes are similar to those in the first embodiment.

Thus, even when a service person updates firmware with the use of a USB storage device as in this embodiment, it is possible to securely prevent the service person from forgetting to remove the USB storage device.

Next, a fourth embodiment of the present invention will be described.

In this fourth embodiment, description will be made on a control method for an administrator or an IT manager to import/export management information and the like to/from a storage device provided with a USB host interface, in an image forming apparatus provided with a USB interface.

The configuration of the image forming apparatus as an electronic apparatus according to this embodiment is the same as that of the third embodiment shown in FIGS. 13 and 14, and therefore, description thereof will be omitted.

A process for importing/exporting the management information of the image forming apparatus 301 is such that is obtained by replacing the service mode with an administrator mode in the flowcharts in FIGS. 3 and 4 and replacing the firmware update process at step S13 in FIG. 3 with a management information import/export process.

The administrator mode is generally a mode protected by means of password or user authentication. For example, a password authentication screen is displayed by performing a predetermined operation on the display/operation section 104, and then the mode can be switched to the administrator mode by inputting a correct password on the screen. Alternatively, any authorized user can switch the mode to the administrator mode by performing a predetermined operation.

The import/export process is instructed by an administrator via the display/operation section 104 after the mode is switched to the administrator mode by the mode switching module 201. In the export process, management information stored in the storage device 105 is written to a connected USB storage device 122. In the import process, management information stored in a USB storage device 122 is read and stored in the storage device 105.

The flow for the case where switching from the administrator mode to the normal mode is attempted while a USB storage device 122 is not removed is the same as the flow shown in FIG. 3, and therefore, description thereof will be omitted.

The process to be performed when the image forming apparatus 301 is restarted without switching the mode to the normal mode after update of firmware is completed is equivalent to the process in FIG. 4, and therefore description thereof will be omitted.

Thus, even when an administrator performs the process for importing/exporting management information of an image forming apparatus using a USB storage device, it is possible to securely prevent the administrator from forgetting to remove the USB storage device.

Next, a fifth embodiment of the present invention will be described.

In this fifth embodiment, description will be made on a method for preventing a user from forgetting to remove a USB device other than a USB storage device, wherein pieces of information about USB devices each of which should be prevented from being forgotten to be removed are stored in the storage device 105 and the required descriptor information, other than the interface descriptor, which is included in the above described descriptor information is referred to.

In the following description, as a USB device other than a USB storage device, a USB key is taken as an example, which, when connected to a USB port, makes it possible to automatically login the system. It is assumed that an administrator can login an administrator screen with the use of a USB key, so that he connects the USB key to the USB host interface when performing maintenance for the image forming apparatus 301 and removes the USB key from the interface after completion of maintenance.

A configuration of an image forming apparatus as an electronic apparatus according to this embodiment corresponds to that of the image forming apparatus 301 in FIGS. 13 and 14 in which the USB storage device adapted for connection to the image forming apparatus 301 is replaced by a USB key. A control process of the image forming apparatus according to this embodiment is performed based on the flowchart in FIG. 17 to be described later.

Figure 17:
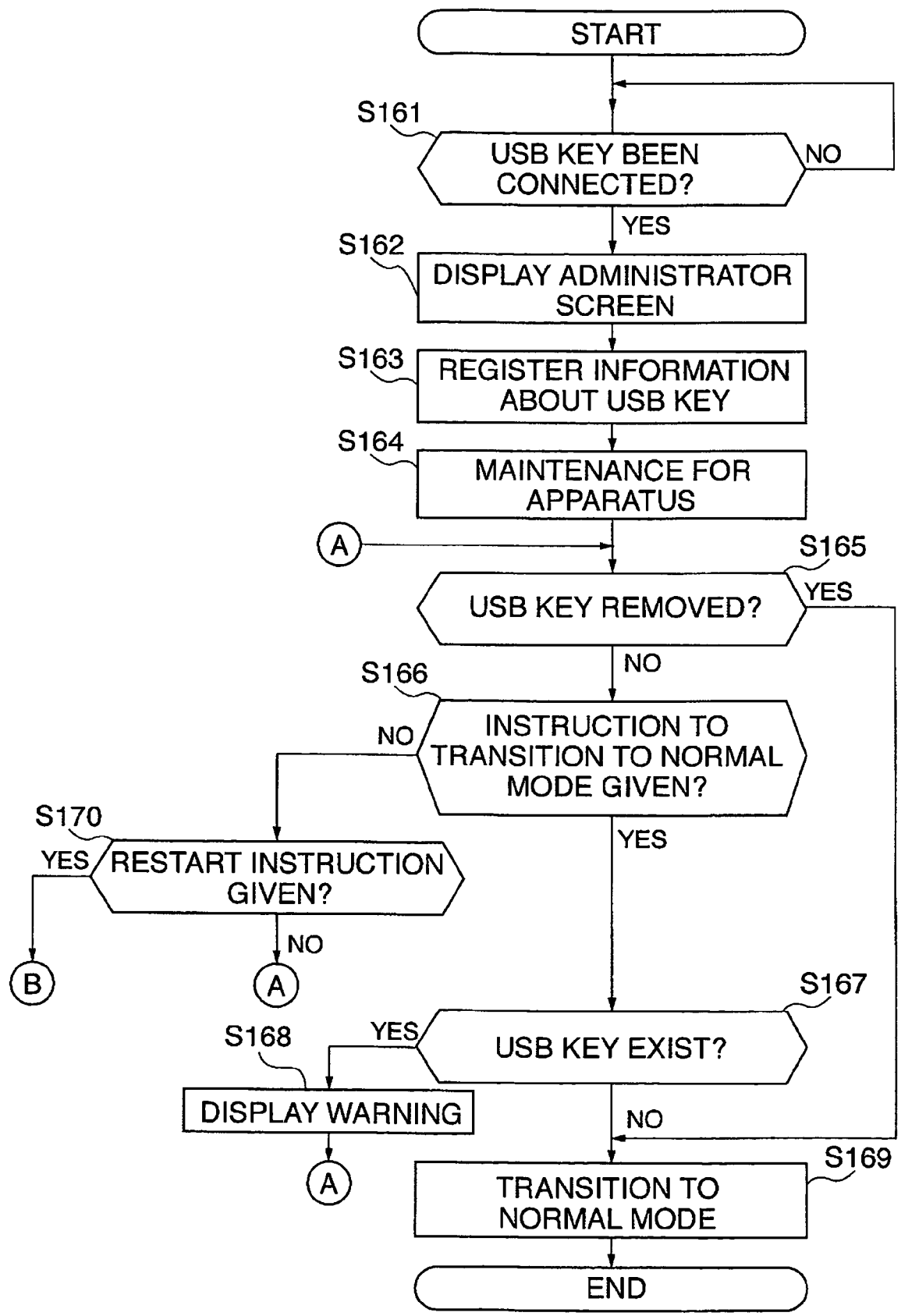
FIG. 17 is a flowchart showing a control process performed by an image forming apparatus as an electronic apparatus according to a fifth embodiment of the present invention.

FIG. 17 is a flowchart showing control a process to be performed by the image forming apparatus as an electronic apparatus according to this embodiment.

First, it is determined whether or not a USB key has been connected to the USB host interface 121 (step S161). If a USB key is connected to the USB host interface 121, then an administrator screen is displayed on the display/operation section 104 (step S162), resulting in a state where an administrator has logged in the administrator screen with the use of the USB key. Next, the administrator registers information about the USB key in the image forming apparatus 301 (step S163). As the method for the registration, a button is provided so as to be displayed on the display/operation section 104 only when a USB device is connected to the interface, and this button is pressed by the administrator. In response to this, the system of the image forming apparatus 301 acquires the value of "idVendor/idProduct" included in the above described device descriptor information (FIG. 15) as information about the connected USB key, and resisters the value as information about device that must be prevented from being forgotten to be removed.

After maintenance for the image forming apparatus 301 has been performed by the administrator (step S164), it is determined whether or not a USB key has been removed by the administrator (step S165). If the USB key removal has been performed, then the mode transitions to the normal mode (step S169).

If the USB key removal has not been performed (NO to step S164), then it is determined whether or not it has been instructed to switch from the administrator mode to the normal mode (step S166). If it has been instructed to switch from the administrator mode to the normal mode, then it is determined whether or not the USB key registered at step S163 exists based on the information about device that must be prevented from being forgotten to be removed (step S167). If the registered USB key exists, there is a possibility that the administrator has forgotten to remove the USB key.

Then, a warning is displayed at step S168 to instruct the administrator to remove the USB key, and the process returns to step S165. Due to this repetition process, switching from the administrator mode to the normal mode cannot be performed until the administrator removes the USB key (YES to step S165).

Thereby, even if an administrator forgets to remove a USB key after finishing maintenance work for the image forming apparatus, he can notice it. Thus, it is possible to securely prevent the administrator from forgetting to remove the USB key.

It is to be understood that the object of the present invention may also be accomplished by supplying a system or an apparatus with a storage medium in which a program code of software, which realizes the functions of either of the above described embodiments is stored, and causing a computer (or CPU, MPU or the like) of the system or apparatus to read out and execute the program code stored in the storage medium.

In this case, the program code itself read from the storage medium realizes the functions of either of the above described embodiments, and hence the program code and a storage medium on which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW and a DVD+RW, a magnetic tape, a nonvolatile memory card, and a ROM. Alternatively, the program code may be downloaded via a network.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiments may be accomplished by writing the program code read out from the storage medium into a memory provided in an expansion board inserted into a computer or in an expansion unit connected to the computer and then causing a CPU or the like provided in the expansion board or the expansion unit to perform a part or all of the actual operations based on instructions of the program code.

In this case, the program is supplied directly from a storage medium in which the program is stored, or supplied by downloading from another computer, a database, or the like, not shown, connected to the Internet, a commercial network, a local area network, or the like.

This application claims the benefit of Japanese Application No. 2005-103824, filed on Mar. 31, 2005, which is hereby incorporated by reference herein in its entirety.

What is claimed is:

1. An image forming apparatus comprising:

interface means for enabling access to a removable storage device;

mode switching means for performing switching between a normal mode and a service mode, wherein the normal mode is a mode in which a general user performs an image processing with the image forming apparatus using image data or document data stored in another storage device, different from the removable storage device, and the service mode is a mode in which a service person performs maintenance of the image forming apparatus using data stored in the removable storage device;

storage device detecting means for detecting whether the removable storage device is connected to said interface means when said mode switching means performs switching from the service mode to the normal mode;

normal mode inhibiting means for inhibiting switching to the normal mode when the removable storage device is detected by said storage device detecting means;

maintenance allowing means for allowing the service person to perform the maintenance of the image forming apparatus using the data in the removable storage device when the removable storage device is detected by said storage device detecting means after the normal mode has been switched to the service mode; and display means for displaying a warning when the removable storage device is detected by said detecting means in a case where an instruction to switch from the service mode to the normal mode is made by said mode switching means after the service person has performed the maintenance of said image forming apparatus, wherein said display means comprises a display/operation section of said image forming apparatus, and said normal mode inhibiting means causes the display-operation section to display a warning prompting to remove the removable storage device.

2. An image forming apparatus according to claim 1, wherein said storage device detecting means comprises determination means for periodically communicating with said removable storage device to determine whether said removable storage device is in an available state, a holding means for holding determination information obtained by said determination means, and detection means for detecting that said removable storage device is connected to said interface means based on the determination information held by said holding means.

3. An image forming apparatus according to claim 1, wherein said interface means is a drive unit included in the image forming apparatus.

4. An image forming apparatus according to claim 1, wherein said interface means is a general-purpose interface included in the image forming apparatus.

5. A control method for controlling an image forming apparatus comprising interface means for enabling access to a removable storage device, said image forming apparatus being capable of executing, separately from a normal mode, a service mode, wherein the normal mode is a mode in which a general user performs an image processing with the image forming a apparatus using image data or document data stored in another storage device different from the removable storage device, and the service mode is a mode in which a service person performs maintenance of the image forming apparatus using data stored in the removable storage device, the method comprising:

a mode switching step of performing switching between the normal mode and the service mode;

a storage device detecting step of detecting whether the removable storage device is connected to the interface means when the mode switching step performs switching from the service mode to the normal mode;

a normal mode inhibiting step of inhibiting switching to the normal mode when the removable storage device is detected in said storage device detecting step;

a maintenance allowing step of allowing the service person to perform the maintenance of the image forming apparatus using the data in the removable storage device when the removable storage device is detected in said storage device detecting step after the normal mode has been switched to the service mode; and a warning displaying step of displaying a warning in a display/operating section of said image forming apparatus when the removable storage device is detected in said storage device detecting step in a case where an instruction to switch from the service mode to the normal mode is made in said mode switching step after the service person has performed the maintenance of said image forming apparatus, wherein said normal mode inhibiting step causes the display-operation section to display a warning prompting to remove the removable storage device.

6. A computer-readable medium storing a computer program for performing a control method for controlling an image forming apparatus comprising interface means for enabling access to a removable storage device, said image forming apparatus being capable of executing, separately from a normal mode, a service mode, wherein the normal mode is a mode in which a general user performs an image processing with the image forming apparatus using image data or document data stored in another storage device different from the removable storage device, and the service mode is a mode in which a service person performs maintenance of the image forming apparatus using data stored in the removable storage device, the control method comprising:

a mode switching step of performing switching between the normal mode and the service mode;

a storage device detecting step of detecting whether the removable storage device is connected to the interface means when the mode switching step performs switching from the service mode to the normal mode;

a normal mode inhibiting step of inhibiting switching to the normal mode when the removable storage device is detected in said storage device detection step;

a maintenance allowing step of allowing the service person to perform the maintenance of the image forming apparatus using the data in the removable storage device when the removable storage device is detected in said storage device detecting step after the normal mode has been switched to the service mode; and a warning displaying step of displaying a warning in a display/operating section of said image forming apparatus when the removable storage device is detected in said storage device detecting step in a case where an instruction to switch from the service mode to the normal mode is made in said mode switching step after the service person has performed the maintenance of said image forming apparatus, wherein said normal mode inhibiting step causes the display-operation section to display a warning prompting to remove the removable storage device.

7. An image forming apparatus comprising:

interface means for enabling access to a removable storage device;

mode switching means for performing switching between a normal mode and a specific mode, wherein the normal mode is a mode in which a general user performs an image processing with the image forming apparatus using image data or document data stored in another storage device different from the removable storage device, and the specific mode is a mode in which a service person or an administrator performs a particular process of the image forming apparatus using data stored in the removable storage device;

storage device detecting means for detecting whether the removable storage device is connected to said interface means; and control means for executing said particular process when said mode switching means performs switching from the normal mode to the specific mode and if said storage device detecting means detects the removable storage device, wherein the particular process includes at least one of an update of a firmware of the image forming apparatus and an import /export of management information of the image forming apparatus.

8. An image forming apparatus according to claim 7, further comprising inhibiting means for inhibiting switching to the normal mode when said mode switching means performs switching from the specific mode to the normal mode and if the removable storage device is detected by said storage device detecting means.

9. A control method for controlling an image forming apparatus comprising interface means for enabling access to a removable storage device, said image forming apparatus being capable of executing, separately from a normal mode, a specific mode, wherein the normal mode is a mode in which a general user performs an image processing with the image forming apparatus using image data or document data stored in another storage device different from the removable storage device, and the specific mode is a mode in which a service person or an administrator performs a particular process of the image forming apparatus using data stored in the removable storage device, the method comprising:

a storage device detecting step of detecting whether the removable storage device is connected to the interface means;

a mode switching step of performing switching between the normal mode and the specific mode; and a control step of executing said particular process when said mode switching step performs switching from the normal mode to the specific mode and if said storage device detecting means detects the removable storage device, wherein the particular process includes at least one of an update of a firmware of the image forming apparatus and an import/export of management information of the image forming apparatus.

10. A control method according to claim 7, further comprising an inhibiting step of inhibiting switching to the normal mode when said mode switching step performs switching from the specific mode to the normal mode and if the removable storage device is detected in said storage device detecting step.

* * * * *